United States Patent
Barnett, Jr.

(10) Patent No.: US 10,832,665 B2
(45) Date of Patent: Nov. 10, 2020

(54) INTERNET OF THINGS (IOT) HUMAN INTERFACE APPARATUS, SYSTEM, AND METHOD

(71) Applicant: CenturyLink Intellectual Property LLC, Denver, CO (US)

(72) Inventor: Thomas C. Barnett, Jr., Monroe, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 15/370,764

(22) Filed: Dec. 6, 2016

(65) Prior Publication Data
US 2017/0345420 A1 Nov. 30, 2017

Related U.S. Application Data

(60) Provisional application No. 62/342,710, filed on May 27, 2016.

(51) Int. Cl.
*G10L 15/22* (2006.01)
*H04W 4/70* (2018.01)
(Continued)

(52) U.S. Cl.
CPC .............. *G10L 15/22* (2013.01); *G06F 3/167* (2013.01); *G10L 15/14* (2013.01);
(Continued)

(58) Field of Classification Search
CPC .............. G10L 15/22; G10L 2015/223; H04L 12/2816
(Continued)

(56) References Cited

U.S. PATENT DOCUMENTS 4,620,317 A 10/1986 Anderson
5,717,955 A * 2/1998 Swinehart .............. G06F 21/35
710/62
(Continued)

FOREIGN PATENT DOCUMENTS

CN 10-1799987 11/2011
KR 2015-0128346 A 11/2015
(Continued)

OTHER PUBLICATIONS

International Search Report and Written Opinion prepared by the Korean Intellectual Property Office as International Searching Authority for PCT International Patent Application No. PCT/US2017/034531 dated Aug. 29, 2017; 18 pages.
(Continued)

*Primary Examiner* — Daniel C Washburn
*Assistant Examiner* — Oluwadamilola M Ogunbiyi

(57) ABSTRACT

Novel tools and techniques are provided for implementing Internet of Things ("IoT") functionality. In some embodiments, microphones of an IoT human interface device might receive user voice input. The IoT human interface device and/or a computing system might identify explicit commands in the voice input, identify first IoT-capable devices to which the explicit commands are applicable, receive sensor data from IoT sensors, and analyze the voice input in view of previous user voice inputs and in view of the sensor data to determine whether the voice input contains any implicit commands. If so, second IoT-capable devices to which an implicit command is additionally applicable might be identified, instructions based on a combination of the explicit and implicit commands may be generated and sent to the second IoT-capable devices. Instructions based only on the explicit commands are generated and sent to first
(Continued)

IoT-capable devices to which implicit commands are not applicable.

30 Claims, 12 Drawing Sheets

(51) Int. Cl.

| | | |
|---|---|---|
| *G06F 3/16* | (2006.01) | |
| *G10L 15/14* | (2006.01) | |
| *G10L 15/18* | (2013.01) | |
| *G10L 15/30* | (2013.01) | |
| *H04L 12/28* | (2006.01) | |
| *H04L 29/08* | (2006.01) | |

(52) U.S. Cl.
CPC .......... *G10L 15/1815* (2013.01); *G10L 15/30* (2013.01); *H04L 12/2816* (2013.01); *H04L 67/10* (2013.01); *H04W 4/70* (2018.02); *G10L 2015/223* (2013.01); *G10L 2015/227* (2013.01); *G10L 2015/228* (2013.01)

(58) Field of Classification Search
USPC .......................................... 704/257, E15.04
See application file for complete search history.

(56) References Cited

U.S. PATENT DOCUMENTS

| | | | |
|---|---|---|---|
| 6,125,291 A | 9/2000 | Miesel | |
| 6,388,399 B1 | 5/2002 | Eckel | |
| 6,448,980 B1* | 9/2002 | Kumar | G06F 16/954 |
| | | | 715/745 |
| 6,792,319 B1 | 9/2004 | Bilger | |
| 7,030,781 B2 | 4/2006 | Jones | |
| 7,096,003 B2 | 8/2006 | Joao | |
| 7,162,421 B1* | 1/2007 | Zeppenfeld | G10L 15/22 |
| | | | 704/233 |
| 7,397,363 B2 | 7/2008 | Joao | |
| 7,739,030 B2 | 6/2010 | Desai | |
| 8,296,383 B2* | 10/2012 | Lindahl | G10L 15/30 |
| | | | 379/93.24 |
| 8,380,652 B1 | 2/2013 | Francis, Jr. | |
| 8,654,936 B1 | 2/2014 | Eslambolchi et al. | |
| 9,298,410 B2 | 3/2016 | Juchem | |
| 9,432,340 B1 | 8/2016 | Tutt et al. | |
| 9,456,276 B1* | 9/2016 | Chhetri | H04R 3/005 |
| 9,460,618 B1 | 10/2016 | Soltesz | |
| 9,536,425 B1 | 1/2017 | Soltesz | |
| 9,646,480 B2 | 5/2017 | Fadell | |
| 9,669,872 B2 | 6/2017 | Rebhan | |
| 9,672,734 B1 | 6/2017 | Ratnasingam | |
| 9,761,136 B2 | 9/2017 | Tonguz | |
| 9,860,677 B1 | 1/2018 | Agerstam | |
| 9,905,122 B2 | 2/2018 | Sloo | |
| 9,917,903 B2 | 3/2018 | Clernon | |
| 10,019,561 B1* | 7/2018 | Shelton | G10L 17/00 |
| 10,069,751 B2 | 9/2018 | Amulothu | |
| 10,253,468 B1 | 4/2019 | Linville | |
| 2002/0024450 A1 | 2/2002 | Townsend | |
| 2002/0132616 A1* | 9/2002 | Ross | H04M 1/72572 |
| | | | 455/419 |
| 2002/0135618 A1* | 9/2002 | Maes | G06K 9/00248 |
| | | | 715/767 |
| 2003/0048926 A1* | 3/2003 | Watanabe | G06K 9/00362 |
| | | | 382/103 |
| 2003/0061029 A1* | 3/2003 | Shaket | G06F 17/279 |
| | | | 704/9 |
| 2003/0074253 A1* | 4/2003 | Scheuring | G06Q 30/08 |
| | | | 705/7.33 |
| 2004/0083054 A1 | 4/2004 | Jones | |
| 2004/0091313 A1 | 5/2004 | Zhou | |
| 2004/0113773 A1 | 6/2004 | Nieters | |
| 2004/0142658 A1 | 7/2004 | McKenna | |
| 2004/0160319 A1 | 8/2004 | Joao | |
| 2005/0248444 A1 | 11/2005 | Joao | |
| 2006/0150644 A1 | 7/2006 | Wruck | |
| 2006/0219382 A1 | 10/2006 | Johnson | |
| 2007/0048084 A1 | 3/2007 | Jung | |
| 2007/0079113 A1 | 4/2007 | Kulkarni et al. | |
| 2007/0247794 A1 | 10/2007 | Jaffe | |
| 2008/0197204 A1 | 8/2008 | Whitney | |
| 2008/0216367 A1 | 9/2008 | Van der Poel | |
| 2008/0234878 A1 | 9/2008 | Joao | |
| 2008/0256008 A1* | 10/2008 | Kwok | G06N 3/004 |
| | | | 706/20 |
| 2008/0300776 A1 | 12/2008 | Petrisor | |
| 2008/0303654 A1 | 12/2008 | Kates | |
| 2009/0121860 A1 | 5/2009 | Kimmel | |
| 2009/0125160 A1 | 5/2009 | Desai | |
| 2009/0134993 A1 | 5/2009 | Ashworth | |
| 2009/0292657 A1* | 11/2009 | Jung | G06F 3/011 |
| | | | 706/11 |
| 2009/0327910 A1 | 12/2009 | Black | |
| 2010/0042403 A1* | 2/2010 | Chandrasekar | G06F 40/20 |
| | | | 704/9 |
| 2010/0042470 A1* | 2/2010 | Chang | G06Q 30/0241 |
| | | | 705/14.64 |
| 2010/0045484 A1 | 2/2010 | Brynielsson | |
| 2010/0124332 A1 | 5/2010 | Arena | |
| 2010/0217604 A1 | 8/2010 | Baldwin et al. | |
| 2010/0251305 A1* | 9/2010 | Kimble | H04N 21/4668 |
| | | | 725/46 |
| 2010/0325421 A1 | 12/2010 | Park et al. | |
| 2010/0332842 A1* | 12/2010 | Kalaboukis | G06Q 30/02 |
| | | | 713/186 |
| 2011/0029311 A1* | 2/2011 | Minamino | G10L 15/183 |
| | | | 704/243 |
| 2011/0106321 A1 | 5/2011 | Cherian | |
| 2011/0161076 A1* | 6/2011 | Davis | G06F 3/04842 |
| | | | 704/231 |
| 2011/0288684 A1 | 11/2011 | Farlow | |
| 2012/0086563 A1 | 4/2012 | Arling | |
| 2012/0249341 A1 | 10/2012 | Brown | |
| 2012/0265370 A1 | 10/2012 | Kim | |
| 2013/0009569 A1 | 1/2013 | Knibbe | |
| 2013/0038461 A1 | 2/2013 | Hawkes | |
| 2013/0074067 A1 | 3/2013 | Chowdhry | |
| 2013/0080898 A1 | 3/2013 | Lavian | |
| 2013/0138424 A1* | 5/2013 | Koenig | G06F 17/271 |
| | | | 704/9 |
| 2013/0217421 A1 | 8/2013 | Kim | |
| 2013/0238326 A1 | 9/2013 | Kim et al. | |
| 2013/0297199 A1 | 11/2013 | Kapp | |
| 2014/0018969 A1 | 1/2014 | Forbes | |
| 2014/0033288 A1 | 1/2014 | Wynn | |
| 2014/0146905 A1 | 5/2014 | Zavadsky | |
| 2014/0167931 A1 | 6/2014 | Lee et al. | |
| 2014/0180478 A1 | 6/2014 | Letsky | |
| 2014/0188463 A1 | 7/2014 | Noh et al. | |
| 2014/0253666 A1* | 9/2014 | Ramachandran | H04W 4/12 |
| | | | 348/14.06 |
| 2014/0257693 A1 | 9/2014 | Ehlers | |
| 2014/0274203 A1* | 9/2014 | Ganong, III | H04W 52/0251 |
| | | | 455/556.1 |
| 2014/0275852 A1 | 9/2014 | Hong | |
| 2014/0297363 A1* | 10/2014 | Vemana | G06Q 30/0269 |
| | | | 705/7.29 |
| 2014/0343950 A1* | 11/2014 | Simpson | G10L 15/22 |
| | | | 704/275 |
| 2015/0097686 A1 | 4/2015 | Fadell | |
| 2015/0100167 A1 | 4/2015 | Sloo | |
| 2015/0187200 A1 | 7/2015 | Fadell | |
| 2015/0249672 A1 | 9/2015 | Burns et al. | |
| 2015/0262102 A1 | 9/2015 | Tann | |
| 2015/0298654 A1 | 10/2015 | Joao | |
| 2015/0348551 A1* | 12/2015 | Gruber | G06F 40/205 |
| | | | 704/235 |
| 2015/0350247 A1 | 12/2015 | Adler et al. | |
| 2015/0365278 A1* | 12/2015 | Chakrabarti | H04L 41/0806 |
| | | | 370/254 |

(56) References Cited

U.S. PATENT DOCUMENTS

| | | | |
|---|---|---|---|
| 2015/0382047 A1* | 12/2015 | Van Os | G06F 16/73 |
| | | | 725/38 |
| 2016/0021127 A1 | 1/2016 | Yan | |
| 2016/0029346 A1* | 1/2016 | Suresh | H04W 72/005 |
| | | | 340/539.16 |
| 2016/0063857 A1 | 3/2016 | Fowe | |
| 2016/0064829 A1 | 3/2016 | Schaepperle | |
| 2016/0080322 A1 | 3/2016 | Prisser | |
| 2016/0085594 A1 | 3/2016 | Wang | |
| 2016/0093213 A1 | 3/2016 | Rider | |
| 2016/0187995 A1* | 6/2016 | Rosewall | H04W 4/02 |
| | | | 345/156 |
| 2016/0195876 A1 | 7/2016 | Mattsson | |
| 2016/0212012 A1 | 7/2016 | Young | |
| 2016/0212613 A1* | 7/2016 | Huang | H04W 8/20 |
| 2016/0224524 A1* | 8/2016 | Kay | G06F 3/0237 |
| 2016/0226674 A1* | 8/2016 | Kangshang | G06F 3/0481 |
| 2016/0248746 A1 | 8/2016 | James | |
| 2016/0267790 A1 | 9/2016 | Raamot | |
| 2016/0277310 A1 | 9/2016 | Challa | |
| 2016/0278599 A1 | 9/2016 | Seo | |
| 2016/0294828 A1 | 10/2016 | Zakaria | |
| 2016/0295364 A1 | 10/2016 | Zakaria | |
| 2016/0323271 A1 | 11/2016 | Hinman | |
| 2016/0329040 A1 | 11/2016 | Whinnery | |
| 2016/0330042 A1* | 11/2016 | Andersen | H04L 12/282 |
| 2016/0352526 A1 | 12/2016 | Adler et al. | |
| 2016/0352900 A1* | 12/2016 | Bell | H04M 3/5175 |
| 2016/0359965 A1 | 12/2016 | Murphy et al. | |
| 2017/0006141 A1* | 1/2017 | Bhadra | H04L 67/12 |
| 2017/0006643 A1 | 1/2017 | Zakaria et al. | |
| 2017/0026157 A1 | 1/2017 | Bugenhagen et al. | |
| 2017/0026472 A1 | 1/2017 | Bugenhagen et al. | |
| 2017/0026607 A1 | 1/2017 | Kim | |
| 2017/0060369 A1 | 3/2017 | Goyal | |
| 2017/0068423 A1* | 3/2017 | Napolitano | G06F 16/487 |
| 2017/0083005 A1 | 3/2017 | Hickman | |
| 2017/0093866 A1 | 3/2017 | Ben-Noon | |
| 2017/0110784 A1 | 4/2017 | Vermes et al. | |
| 2017/0132019 A1* | 5/2017 | Karashchuk | G06F 40/166 |
| 2017/0134937 A1 | 5/2017 | Miller | |
| 2017/0141575 A1 | 5/2017 | Fulton | |
| 2017/0171747 A1 | 6/2017 | Britt et al. | |
| 2017/0176034 A1 | 6/2017 | Hussain | |
| 2017/0181383 A1 | 6/2017 | Shen | |
| 2017/0187807 A1 | 6/2017 | Clernon | |
| 2017/0192437 A1 | 7/2017 | Bier | |
| 2017/0195318 A1 | 7/2017 | Liu | |
| 2017/0201504 A1 | 7/2017 | Funk | |
| 2017/0206900 A1* | 7/2017 | Lee | G10L 15/08 |
| 2017/0229004 A1 | 8/2017 | Shah | |
| 2017/0237815 A1 | 8/2017 | Arsenault | |
| 2017/0253258 A1 | 9/2017 | Bramucci | |
| 2017/0274898 A1 | 9/2017 | Nakamura | |
| 2017/0279620 A1 | 9/2017 | Kravitz et al. | |
| 2017/0300953 A1 | 10/2017 | Kim | |
| 2017/0345295 A1 | 11/2017 | Mattar | |
| 2017/0358025 A1 | 12/2017 | Varma | |
| 2017/0371337 A1 | 12/2017 | Ramasamy | |
| 2018/0040172 A1 | 2/2018 | Funk | |
| 2018/0062691 A1 | 3/2018 | Barnett, Jr. | |
| 2018/0084596 A1 | 3/2018 | Schwengler et al. | |
| 2018/0103579 A1 | 4/2018 | Grufman | |
| 2018/0113450 A1 | 4/2018 | Sherony | |
| 2018/0122506 A1 | 5/2018 | Grantcharov | |
| 2018/0132227 A1 | 5/2018 | Ghosh | |
| 2018/0168464 A1 | 6/2018 | Barnett, Jr. et al. | |
| 2018/0174449 A1 | 6/2018 | Nguyen | |
| 2018/0178781 A1 | 6/2018 | Funk et al. | |
| 2018/0181091 A1 | 6/2018 | Funk et al. | |
| 2018/0181094 A1 | 6/2018 | Funk et al. | |
| 2018/0181095 A1 | 6/2018 | Funk et al. | |
| 2018/0183685 A1 | 6/2018 | Cook | |
| 2018/0183874 A1 | 6/2018 | Cook | |
| 2018/0188704 A1 | 7/2018 | Cella | |
| 2018/0295405 A1 | 10/2018 | Barnett, Jr. et al. | |
| 2018/0299290 A1 | 10/2018 | Slavin | |
| 2018/0370567 A1 | 12/2018 | Rowell | |
| 2018/0374347 A1 | 12/2018 | Silver | |
| 2019/0028134 A1 | 1/2019 | Barnett, Jr. | |
| 2019/0035269 A1 | 1/2019 | Donovan | |
| 2019/0049994 A1 | 2/2019 | Pohl | |
| 2019/0073899 A1 | 3/2019 | Radomy | |
| 2019/0106099 A1 | 4/2019 | Funk et al. | |

FOREIGN PATENT DOCUMENTS

| | | |
|---|---|---|
| WO | WO-2009-098676 | 8/2009 |
| WO | WO-2013-058648 | 4/2013 |
| WO | WO-2017-123392 A1 | 7/2017 |

OTHER PUBLICATIONS

International Search Report and Written Opinion prepared by the Korean Intellectual Property Office as International Searching Authority for PCT Intl Patent App. No. PCT/US2016/067938 dated Mar. 31, 2017; 11 pages.

Di Raimondo et al., "Secure-Off the Record Messaging," 2005, 9 pages.

Borisov et al., "Off the Record Communication, or, Why Not to Use PGP," 2004, 8 pages.

Alexander et al., "Improved User Authentication in Off-the-Record Messaging," 2009, 7 pages.

Goldberg et al., "Multi-party Off-the-Record Messaging," 2007, 11 pages.

Bersch,et al., "Bimanual Robotic Cloth Manipulation for Laundry Folding," 2011, 7 pages.

International Preliminary Report on Patentability, dated Jul. 26, 2018, 8 pages.

Stedman, Ryan, et al. (2008), "A User Study of Off-the-Record Messaging", 10 pages.

International Preliminary Report on Patentability prepared by the International Bureau for PCT/US17/34531, dated Nov. 27, 2018, 15 pages.

* cited by examiner

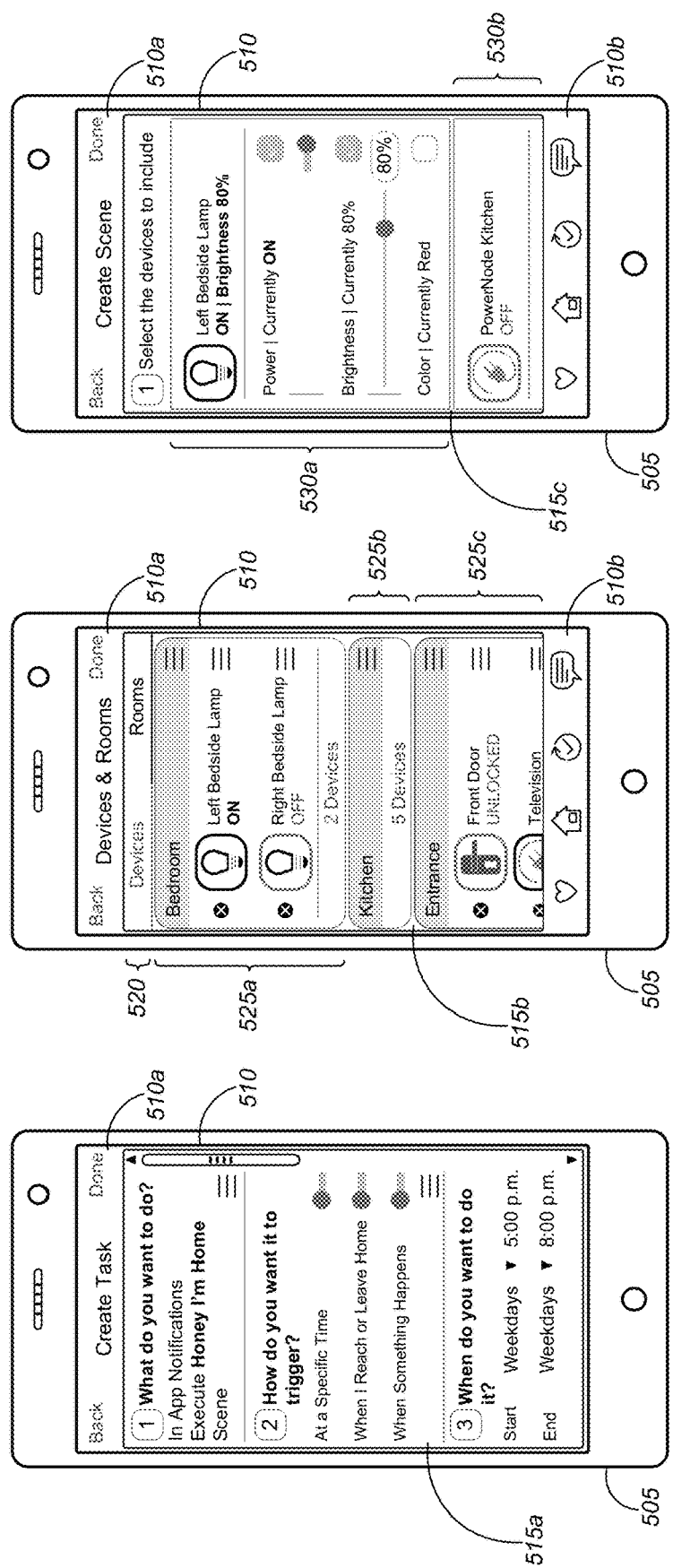

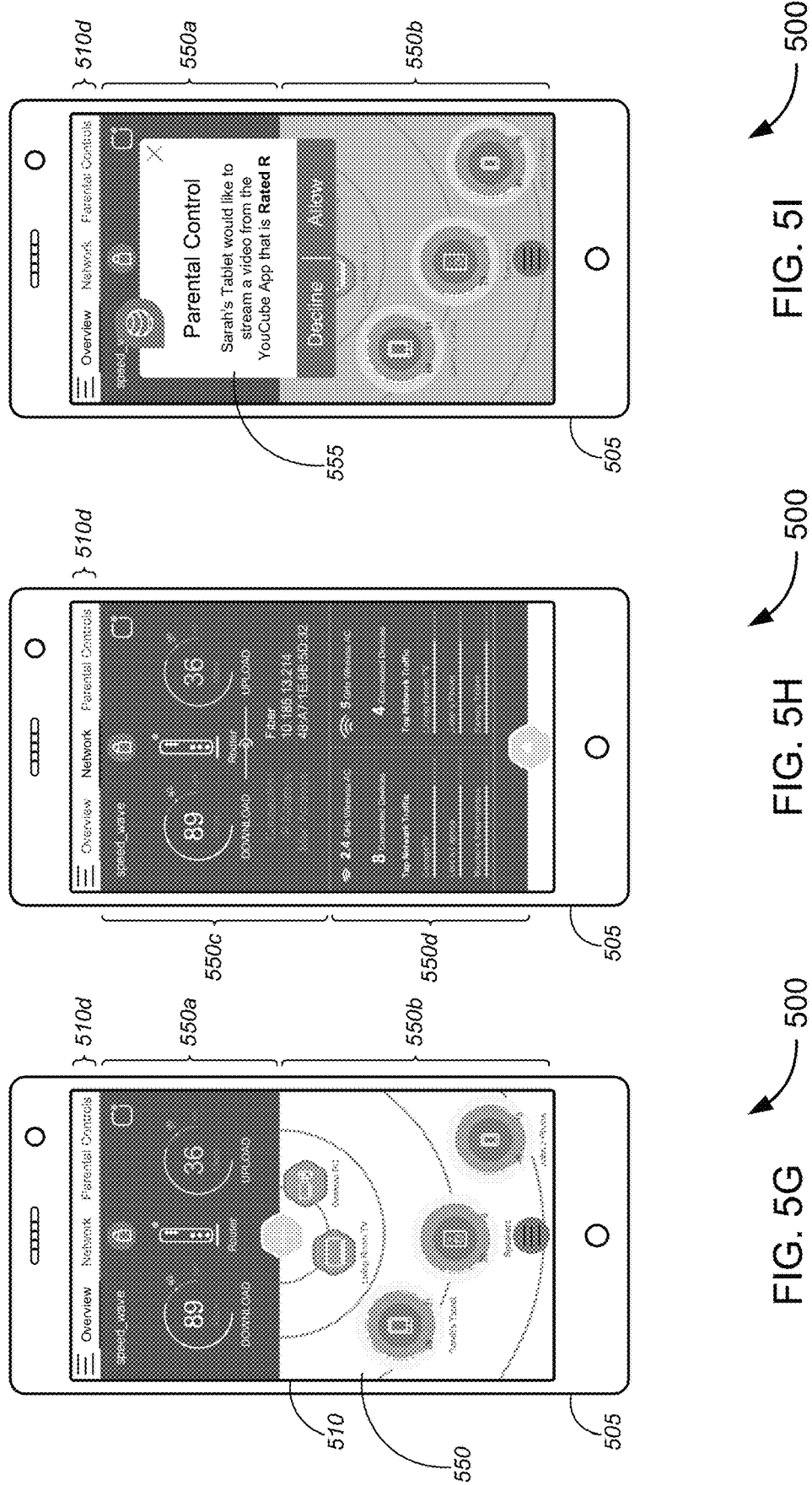

INTERNET OF THINGS (IOT) HUMAN INTERFACE APPARATUS, SYSTEM, AND METHOD

CROSS-REFERENCES TO RELATED APPLICATIONS

This application claims priority to U.S. Patent Application Ser. No. 62/342,710 (the "'710 application"), filed May 27, 2016 by Thomas C. Barnett, Jr., et al. and titled, "Internet of Things (IoT) Human Interface Apparatus, System, and Method".

This application may be related to each of U.S. patent application Ser. No. 14/946,540 (the "'540 application"), filed on Nov. 19, 2015 by Michael K. Bugenhagen et al. and titled, "Customer Based Internet of Things (IOT)", which claims priority to U.S. Patent Application Ser. No. 62/196,086 (the "'086 application"), filed Jul. 23, 2015 by Michael K. Bugenhagen et al. and titled, "Customer Based Internet of Things (IOT)"; U.S. patent application Ser. No. 14/946,548 (the "'548 application"), filed on Nov. 19, 2015 by Michael K. Bugenhagen et al. and titled, "Customer Based Internet of Things (IOT)—Transparent Privacy Functionality", which claims priority to U.S. Patent Application Ser. No. 62/196,090 (the "'090 application"), filed Jul. 23, 2015 by Michael K. Bugenhagen and titled, "Customer Based Internet of Things (IOT)—Transparent Privacy Functionality"; and U.S. patent application Ser. No. 15/084,805 (the "'805 application"), filed on Mar. 30, 2016 by Tom Funk and titled, "System and Method for Implementing Secure Communications for Internet of Things (IOT) Devices", which claims priority to U.S. Patent Application Ser. No. 62/277,245 (the "'245 application"), filed Jan. 11, 2016 by Tom Funk and titled, "IoT Security through Combining TOR Messenger with MQTT or Additional Protocols". This application may also be related to U.S. Patent Application Ser. No. 62/397,086 (the "'7086 application"), filed Sep. 20, 2016 by Thomas Schwengler et al. and titled, "Universal Wireless Station for Multiple Simultaneous Wireless Services" and U.S. Patent Application Ser. No. 62/403,878 (the "'878 application"), filed Oct. 4, 2016 by Thomas Schwengler et al. and titled, "Universal Wireless Station for Multiple Simultaneous Wireless Services".

This application may also be related to each of U.S. patent application Ser. No. 14/678,208 (the "'208 application"), filed Apr. 3, 2015 by Michael J. Fargano et al. and titled, "Network Functions Virtualization Interconnection Gateway", which claims priority to U.S. Patent Application Ser. No. 61/974,927, filed Apr. 3, 2014 by Michael J. Fargano and titled, "Network Functions Virtualization Interconnection Gateway"; U.S. patent application Ser. No. 14/678,280 (the "'280 application"), filed on Apr. 3, 2015 by Michael J. Fargano et al. and titled, "Network Functions Virtualization Interconnection Hub", which claims priority to U.S. Patent Application Ser. No. 61/974,930, filed Apr. 3, 2014 by Michael J. Fargano and titled, "Network Functions Virtualization Interconnection Hub"; and U.S. patent application Ser. No. 14/678,309 (the "'309 application"), filed Apr. 3, 2015 by Michael J. Fargano et. al and titled, "Customer Environment Network Functions Virtualization (NFV)", which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977,820, filed Apr. 10, 2014 by Michael J. Fargano and titled, "Customer Environment Network Functions Virtualization (NFV)".

This application may be related to each of U.S. patent application Ser. No. 14/730,695 (the "'695 application"), filed Jun. 4, 2015 by Charles I. Cook et al. and titled, "Remoting Application Servers", which claims priority to U.S. Patent Application Ser. No. 62/037,096, filed Aug. 13, 2014 by Charles I. Cook et al. and titled, "Remoting Application Servers"; U.S. patent application Ser. No. 14/983,884 (the "'884 application"), filed Dec. 30, 2015 by Kevin M. McBride et al. and titled, "Intent-Based Services Orchestration", which claims priority to U.S. Patent Application Ser. No. 62/233,911, filed Sep. 28, 2015 by Kevin M. McBride et al. and titled, "Intent-Based Services Orchestration" and U.S. Patent Application Ser. No. 62/247,294, filed Oct. 28, 2015 by Kevin M. McBride et al. and titled, "Intent-Based Services Orchestration"; and U.S. patent application Ser. No. 14/983,758 (the "'758 application"), filed Dec. 30, 2015 by Michael K. Bugenhagen and titled, "Virtual Machine-To-Port Peripheral Device Driver", which claims priority to U.S. Patent Application Ser. No. 62/237,981, filed Oct. 6, 2015 by Michael K. Bugenhagen and titled, "NFV Peripheral Network Driver for VNF's".

This application may also be related to each of U.S. patent application Ser. No. 15/148,688 (the "'688 application"), filed on May 6, 2016 by Charles I. Cook et al. and titled, "System and Method for Implementing Network Enhanced Gateway Functionality"; U.S. patent application Ser. No. 15/148,705 (the "'705 application"), filed on May 6, 2016 by Charles I. Cook et al. and titled, "System and Method for Implementing Extension of Customer LAN at Provider Network Service Point"; U.S. patent application Ser. No. 15/148,711 (the "'711 application"), filed May 6, 2016 by Charles I. Cook et al. and titled, "System and Method for Implementing Isolated Service Overlays between Provider Network Service Point and Customer Premises"; U.S. patent application Ser. No. 15/148,721 (the "'721 application"), filed on May 6, 2016 by Charles I. Cook et al. and titled, "System and Method for Implementing Network Experience Shifting"; and U.S. patent application Ser. No. 15/222,623 (the "'623 application"), filed Jul. 28, 2016 by Michael K. Bugenhagen et al. and titled, "System and Method for Implementing Customer Control Point or Customer Portal". Each of the '688, '705, '711, and '721 applications claim priority to each of U.S. Patent Application Ser. No. 62/157,795 (the "'795 application"), filed May 6, 2015 by Charles I. Cook et al. and titled, "NFVI Enhanced Open Business/Residential Gateways and Customer Portal", U.S. Patent Application Ser. No. 62/159,788 (the "'788 application"), filed May 11, 2015 by Charles I. Cook et al. and titled, "NFVI Enhanced Open Business/Residential Gateways and Customer Portal", U.S. Patent Application Ser. No. 62/172,359 (the "'359 application"), filed Jun. 8, 2015 by Charles I. Cook et al. and titled, "Enhanced LAN With Customer Portal Control". The '721 application further claims priority to U.S. Patent Application Ser. No. 62/299,346 (the "'346 application"), filed Feb. 24, 2016 by Charles I. Cook et al. and titled, "Experience Shifting". The '623 application claims priority to the '346 application and to U.S. Patent Application Ser. No. 62/299,357 (the "'357 application"), filed Feb. 24, 2016 by Michael K. Bugenhagen et al. and titled, "Control Point or Customer Portal".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing Internet of Things functionality, and, in particular embodiments, to methods, systems, apparatus, and computer software for implementing Internet of Things ("IoT") human interface functionality.

BACKGROUND

Although there are human interface devices currently on the market and being used by consumers, such conventional human interface devices do not utilize full interconnectedness with external sensors and other devices to infer intent of a user based on a combination of the user's commands (e.g., voice commands) and sensor data from external sensors, and in response to the explicit and inferred commands send instructions to other devices to perform tasks consistent with the explicit and inferred commands.

Hence, there is a need for more robust and scalable solutions for implementing Internet of Things functionality, and, in particular embodiments, to methods, systems, apparatus, and computer software for implementing Internet of Things ("IoT") human interface functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5I are illustrations of user devices used by users that present exemplary graphical user interfaces for implementing IoT human interface functionality, in accordance with various embodiments.

DETAILED DESCRIPTION OF CERTAIN EMBODIMENTS

Overview

Figure 1A:
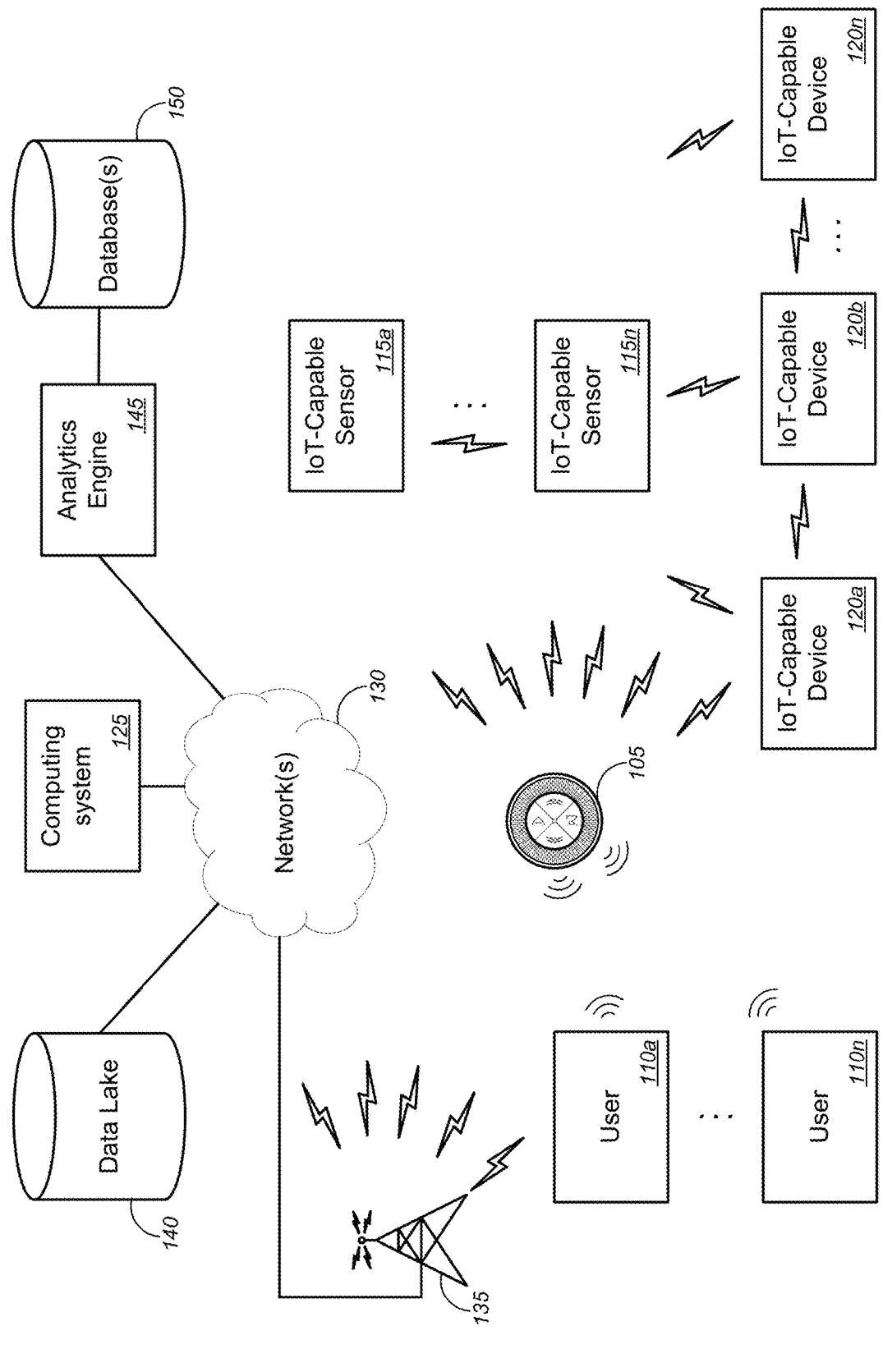
FIGS. 1A and 1B are schematic diagrams illustrating various systems for implementing Internet of Things ("IoT") human interface functionality, in accordance with various embodiments.

Various embodiments provide tools and techniques for implementing Internet of Things functionality, and, in particular embodiments, to methods, systems, apparatus, and computer software for implementing Internet of Things ("IoT") human interface functionality.

In various embodiments, a user might interact with an IoT human interface device. In some cases, the interaction might include a verbal interaction, a non-verbal interaction (e.g., gesturing or the like), or a combination of verbal and non-verbal interactions. In the case of verbal interactions, each of a plurality of microphones of the IoT human interface device might receive voice input from the user, and the IoT human interface device and/or a computing system might identify one or more explicit commands in the voice input; might identify one or more first IoT-capable devices of the plurality of IoT-capable devices to which the one or more explicit commands are applicable; might receive one or more first sensor data from each of at least one first sensor of the plurality of IoT-capable sensors; might analyze the first voice input in view of previous voice inputs from the user and in view of the one or more first sensor data (both of which might be stored on a built-in data store or in data lake, or the like), to determine whether the first voice input additionally contains any implicit commands. Based on a determination that the first voice input contains at least one implicit command, the IoT human interface device and/or the computing system might identify one or more second IoT-capable devices of the one or more first IoT-capable devices to which the at least one implicit command is additionally applicable, generate second instructions for each of the one or more second IoT-capable devices, using a combination of the one or more explicit commands and the at least one implicit command, and send the generated second instructions to the one or more second IoT-capable devices. For each of the one or more first IoT-capable devices to which the at least one implicit command is not applicable, the IoT human interface device and/or the computing system might generate first instructions, using the one or more explicit commands, and send the generated first instructions to the one or more first IoT-capable devices to which the at least one implicit command is not applicable.

In some embodiments, the computing system might include, without limitation, one of a single processor disposed within the IoT human interface device, a plurality of processors disposed within the IoT human interface device, a server computer remote from the IoT human interface device, a cloud computing system, a distributed computing system that integrates computing resources from two or more IoT-capable devices of the plurality of IoT-capable devices, or a combination of two or more of these computing systems, and/or the like.

In this manner, the IoT human interface device and/or the computing system might determine what the user intended based on natural language speech of the user (and not just based on the literal words spoken by the user). Although the embodiments above are described with respect to voice input, the various embodiments are not so limited and the IoT human interface device and/or the computing system can also interpret nonverbal input to determine intended non-verbal input and to act accordingly, or to interpret a combination of verbal and non-verbal input to determined intended non-verbal plus verbal input and to act accordingly.

In various embodiments, an IoT human interface device might include one or more first sensors, which might include, without limitation, one or more temperature sensors, one or more light sensors, one or more humidity sensors, or one or more motion sensors, and/or the like. In some cases, the IoT human interface device might further include one or more second sensors, which might include, but are not limited to, at least one of one or more air quality sensors (e.g., CO sensors, toxic gas sensors, pollution sensors, etc.); one or more audio sensors (e.g., voice sensors (with improved beamforming and better voice recognition and distinction capabilities); speech characteristic discriminators (to identify people based on how he/she speaks, stutters, uses words/phrases, etc.; can distinguish between live speaker and recording), frequency sensors (to detect tornados, lightning, etc.), etc.); one or more accelerometers; one or more proximity sensors; one or more other biometrics sensors; and/or the like. In some instances, the IoT human interface device might comprise other hardware, including, without limitation, one or more speakers, one or more microphones (e.g., a plurality of micro-electro-mechanical systems ("MEMS")-based microphones), one or more processors (for data analysis, although external servers or Cloud computing systems might handle some or all of the data analysis), one or more data storage devices (to locally cache IoT data, sensor data, and/or the like), and/or the like.

According to some embodiments, a plurality of application programming interfaces ("APIs") may communicate with thousands of devices. In some cases, the IoT human interface device might communicate with an IoT stack that handles, coordinates, and/or manages IoT communications and interactions amongst a plurality of IoT devices (and in some instances, all IoT devices) that are communicatively coupled to the service provider network that is associated with the IoT stack and/or to any network with which the IoT stack is in communication. In some embodiments, quantum security methods may be utilized to protect data and user privacy.

Some additional capabilities of the IoT human interface device might include, without limitation, voice over Internet protocol ("VoIP") functionalities; active authentication (which learns how a user interacts with one or more devices (e.g., word usage, phrase usage, keystroke patterns, etc.), and blocks user access if subsequent interaction is determined to be different, and/or the like); mood sensing (e.g., cameras can determine mood of person (and in some cases, can warn others to come back later, etc.)); security mode interaction with other devices/voice recognition/other authentication to open/unlock doors/etc. via voice input, and/or the like; etc. In some embodiments, simple artificial intelligence ("AI") or full AI integration may be utilized within the IoT human interface device to aid in interactions with humans, machine-to-machine interactions, and/or other functionalities. In some instances, a set of thresholds in sensor levels of the IoT human interface device and/or of one or more other IoT devices to which the IoT human interface device is communicatively coupled may be utilized to initiate action (including, but not limited to, alerts, interpretation triggers, specific network actions, specific software/hardware actions, etc.). According to some embodiments, IPv6 identifiers may be used for each IoT device (including the IoT human interface device), in some cases together with other identifiers for the same device (in some cases, identification capability can simplify device registration and/or can be used for machine-to-machine communications, machine-to-network communications, etc.). In some cases, energy harvesting may be utilized to power IoT devices (including the IoT human interface device), either in populated areas or in remote areas. In some embodiments, the IoT human interface device (and/or other IoT devices communicatively coupled thereto) may be configured and/or designed to be agnostic to hardware or network of devices with which it is in communication.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, Internet of Things ("IoT") technology, machine-to-machine communication, and/or the like. In other aspects, certain embodiments, can improve the functioning of user equipment or systems themselves (e.g., automated home systems, IoT device networks, IoT devices, IoT systems, human interface devices, etc.), for example, by analyzing user input (e.g., voice input, non-verbal input, or a combination of verbal and non-verbal input) to determine if the user input contains implicit commands (i.e., to infer intent of the user), in some cases based on prior user input and/or based on sensor data from built-in sensors and/or (external) IoT sensors, and by generating instructions to identified IoT devices to perform functions consistent with the user's explicit and implicit commands, and/or the like. In particular, to the extent any abstract concepts are present in the various embodiments, those concepts can be implemented as described herein by devices, software, systems, and methods that involve specific novel functionality (e.g., steps or operations), such as analyzing user input (e.g., voice input, non-verbal input, or a combination of verbal and non-verbal input) to determine if the user input contains implicit commands (i.e., to infer intent of the user), in some cases based on prior user input and/or based on sensor data from built-in sensors and/or (external) IoT sensors, and by generating instructions to identified IoT devices to perform functions consistent with the user's explicit and implicit commands, which improves the interaction between the user and the human interface device and improves the interaction between the user and the various IoT devices in the customer premises (or around the user), improves the functionality of the human interface device, improves the functionality of the network of IoT devices, and/or the like, to name a few examples, that extend beyond mere conventional computer processing operations. These functionalities can produce tangible results outside of the implementing computer system, including, merely by way of example, improved functionality of the human interface device (i.e., better fidelity with the intent of the user, etc.), improved customer experience with IoT devices, improved lifestyle experience of the user with respect to connected devices in the user's life, and/or the like, at least some of which may be observed or measured by customers and/or service providers.

In an aspect, a method might comprise receiving, with each of a plurality of microphones of an Internet of Things ("IoT") human interface device, a first voice input from a user, the plurality of microphones being disposed within a plane that is parallel with a cylindrical base of the IoT human interface device. The method might further comprise identifying, with a computing system, one or more explicit commands in the first voice input; identifying, with the computing system, one or more first IoT-capable devices of a plurality of IoT-capable devices to which the one or more explicit commands are applicable; receiving, with the computing system, one or more first sensor data from each of at least one first sensor; and analyzing, with the computing system, the first voice input in view of previous voice inputs from the user and in view of the one or more first sensor data, to determine whether the first voice input additionally contains any implicit commands. The method might also comprise, based on a determination that the first voice input contains at least one implicit command, identifying, with the computing system, one or more second IoT-capable devices of the one or more first IoT-capable devices to which the at least one implicit command is additionally applicable, generating, with the computing system, second instructions for each of the one or more second IoT-capable devices, using a combination of the one or more explicit commands and the at least one implicit command, and sending, with the computing system, the generated second instructions to the one or more second IoT-capable devices. The method might further comprise, for each of the one or more first IoT-capable devices to which the at least one implicit command is not applicable, generating, with the computing system, first instructions, using the one or more explicit commands, and sending, with the computing system, the generated first instructions to the one or more first IoT-capable devices to which the at least one implicit command is not applicable.

According to some embodiments, the method might further comprise identifying, with the computing system, one or more third IoT-capable devices of the plurality of IoT-capable devices to which the at least one implicit command is applicable, the one or more third IoT-capable devices being separate from each of the one or more first IoT-capable devices and the one or more second IoT-capable devices; generating, with the computing system, third instructions for each of the one or more third IoT-capable devices, using the at least one implicit command; and sending, with the computing system, the generated third instructions to the one or more third IoT-capable devices.

In some embodiments, analyzing, with the computing system, the first voice input might comprise analyzing, with the computing system, the first voice input utilizing artificial intelligence ("AI") to improve interactions with the user. In some cases, the AI might further be utilized to improve machine-to-machine interactions and to improve utilization of the at least one first sensor and the plurality of IoT-capable devices.

In some instances, the plurality of IoT-capable devices might be separate from the IoT human interface device, the plurality of IoT-capable devices might comprise at least one of one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, or one or more exercise equipment, and/or the like. In some cases, the one or more sensor devices might comprise the at least one first sensor, and the one or more sensor devices might comprise at least one of one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras, and/or the like.

According to some embodiments, the IoT human interface device might comprise the at least one first sensor, and the at least one first sensor might comprise at least one of one or more temperature sensors, one or more light sensors, one or more humidity sensors, or one or more motion sensors, and/or the like. In some cases, the computing system might comprise one of a single processor disposed within the IoT human interface device, a plurality of processors disposed within the IoT human interface device, a server computer remote from the IoT human interface device, a cloud computing system, a distributed computing system that integrates computing resources from two or more IoT-capable devices of the plurality of IoT-capable devices, or a combination of two or more of these computing systems, and/or the like.

In some embodiments, the plurality of IoT-capable devices might be separate from the IoT human interface device, receiving, with the computing system, one or more first sensor data from each of at least one first sensor might comprise receiving, with the computing system, one or more first sensor data from each of at least one first sensor, via one or more application programming interfaces ("APIs") established between the IoT human interface device and each of the at least one first sensor.

Merely by way of example, in some cases, analyzing the first voice input to determine whether the first voice input additionally contains any implicit commands might comprise determining, with the computing system, an intent of the user based at least in part on the previous voice inputs from the user and the one or more first sensor data and determining, with the computing system, a match probability that indicates a probability that the determined intent of the user matches actual intent of the user. In some instances, the first instructions might comprise a data structure that comprises the determined intent of the user, the determined match probability, and a tagged list listing at least the one or more second IoT-capable devices, and/or the like.

In some embodiments, receiving, with each of the plurality of microphones of the IoT human interface device, the first voice input from the user might comprise utilizing at least one of far-field voice recognition, voice distinction, or a beam forming microphone array of the plurality of microphones, and/or the like. In some cases, each IoT-capable device of the plurality of IoT-capable devices might be assigned a unique IPv6 identifier.

In another aspect, a system might comprise at least one first sensor, an Internet of Things ("IoT") human interface device, and a computing system. The IoT human interface device might comprise a cylindrical base, a plurality of microphones that are disposed within a plane that is parallel with the cylindrical base, one or more speakers, at least one first processor, a data store, and a non-transitory computer readable medium in communication with each of the at least one first processor and the data store. The non-transitory computer readable medium might have stored thereon computer software comprising a first set of instructions that, when executed by the at least one first processor, causes the IoT human interface device to: receive, with each of the plurality of microphones, a first voice input from a user; and send the first voice input to a computing system. The computing system might comprise at least one second processor and a non-transitory computer readable medium in communication with the at least one second processor. The non-transitory computer readable medium might have stored thereon computer software comprising a second set of instructions that, when executed by the at least one second processor, causes the computing system to: receive the first voice input from the IoT human interface device; identify one or more explicit commands in the first voice input; identify one or more first IoT-capable devices of a plurality of IoT-capable devices to which the one or more explicit commands are applicable; receive one or more first sensor data from each of the at least one first sensor; analyze the first voice input in view of previous voice inputs from the user and in view of the one or more first sensor data, to determine whether the first voice input additionally contains any implicit commands; based on a determination that the first voice input contains at least one implicit command, identify one or more second IoT-capable devices of the one or more first IoT-capable devices to which the at least one implicit command is additionally applicable, generate second instructions for each of the one or more second IoT-capable devices, using a combination of the one or more explicit commands and the at least one implicit command, and send the generated second instructions to the one or more second IoT-capable devices; and for each of the one or more first IoT-capable devices to which the at least one implicit command is not applicable, generate first instructions, using the one or more explicit commands, and send the generated first instructions to the one or more first IoT-capable devices to which the at least one implicit command is not applicable.

Each of the one or more IoT-capable devices of the plurality of IoT-capable devices might comprise at least one third processor and a non-transitory computer readable medium in communication with the at least one third processor. The non-transitory computer readable medium might have stored thereon computer software comprising a third set of instructions that, when executed by the at least one third processor, causes the IoT-capable device to: receive the generated first or second instructions; perform one or more tasks in accordance with the received first or second instructions; and update the computing system with progress of each of the one or more tasks.

In some embodiments, the second set of instructions, when executed by the at least one second processor, might further cause the computing system to: identify one or more third IoT-capable devices of the plurality of IoT-capable devices to which the at least one implicit command is applicable, the one or more third IoT-capable devices being separate from each of the one or more first IoT-capable devices and the one or more second IoT-capable devices; generate third instructions for each of the one or more third IoT-capable devices, using the at least one implicit command; and send the generated third instructions to the one or more third IoT-capable devices.

According to some embodiments, each microphone of the plurality of microphones is disposed equidistant from adjacent microphones and is disposed at a predetermined radius from a vertical axis that is orthogonal to a center of the cylindrical base of the IoT human interface device.

Merely by way of example, in some cases, the plurality of IoT-capable devices might be separate from the IoT human interface device, and the plurality of IoT-capable devices might comprise at least one of one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, one or more exercise equipment, or the IoT human interface device, and/or the like. In some instances, the one or more sensor devices might comprise the at least one first sensor, and the one or more sensor devices might comprise at least one of one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras, and/or the like.

According to some embodiments, the IoT human interface device might comprise the at least one first sensor, and the at least one first sensor might comprise at least one of one or more temperature sensors, one or more light sensors, one or more humidity sensors, or one or more motion sensors, and/or the like. In some cases, the at least one first sensor might further comprise at least one of one or more air quality sensors, one or more carbon monoxide sensors, one or more smoke detectors, one or more water leak detectors, one or more contact sensors, one or more audio sensors, one or more proximity sensors, one or more biometrics sensors, one or more location sensors, one or more radiation sensors, one or more telecommunications signal sensors, or one or more cameras, and/or the like. In some embodiments, the computing system might comprise one of a single processor disposed within the IoT human interface device, a plurality of processors disposed within the IoT human interface device, a server computer remote from the IoT human interface device, a cloud computing system, a distributed computing system that integrates computing resources from two or more IoT-capable devices of the plurality of IoT-capable devices, or a combination of two or more of these computing systems, and/or the like.

In some instances, receiving one or more first sensor data from each of at least one first sensor might comprise receiving one or more first sensor data from each of at least one first sensor, via one or more application programming interfaces ("APIs") established between the IoT human interface device and each of the at least one first sensor, or the like. In some cases, each IoT-capable device of the plurality of IoT-capable devices is assigned a unique IPv6 identifier.

In yet another aspect, an Internet of Things ("IoT") human interface device might comprise a cylindrical base, a plurality of microphones that are disposed within a plane that is parallel with the cylindrical base, one or more speakers, one or more communications transceivers, at least one processor, a data store, a non-transitory computer readable medium in communication with each of the at least one processor and the data store. The non-transitory computer readable medium might have stored thereon computer software comprising a set of instructions that, when executed by the at least one processor, causes the IoT human interface device to: receive, with each of the plurality of microphones, a first voice input from a user; identify one or more explicit commands in the first voice input; identify one or more first IoT-capable devices of a plurality of IoT-capable devices to which the one or more explicit commands are applicable; receive one or more first sensor data from each of the at least one first sensor; analyze the first voice input in view of previous voice inputs from the user and in view of the one or more first sensor data, to determine whether the first voice input additionally contains any implicit commands; based on a determination that the first voice input contains at least one implicit command, identify one or more second IoT-capable devices of the one or more first IoT-capable devices to which the at least one implicit command is additionally applicable, generate second instructions for each of the one or more second IoT-capable devices, using a combination of the one or more explicit commands and the at least one implicit command, and send the generated second instructions to the one or more second IoT-capable devices; and for each of the one or more first IoT-capable devices to which the at least one implicit command is not applicable, generate first instructions, using the one or more explicit commands, and send the generated first instructions to the one or more first IoT-capable devices to which the at least one implicit command is not applicable.

In some embodiments, the set of instructions, when executed by the at least one processor, might further cause the IoT human interface device to: identify one or more third IoT-capable devices of the plurality of IoT-capable devices to which the at least one implicit command is applicable, the one or more third IoT-capable devices being separate from each of the one or more first IoT-capable devices and the one or more second IoT-capable devices; generate third instructions for each of the one or more third IoT-capable devices, using the at least one implicit command; and send the generated third instructions to the one or more third IoT-capable devices.

According to some embodiments, each microphone of the plurality of microphones might be disposed equidistant from adjacent microphones and might be disposed at a predetermined radius from a vertical axis that is orthogonal to a center of the cylindrical base of the IoT human interface device. In some embodiments, analyzing the first voice input might comprise analyzing the first voice input utilizing artificial intelligence ("AI") to improve interactions with the user. In some cases, the AI might be further utilized to improve machine-to-machine interactions between the IoT human interface device and each of the plurality of IoT-capable devices, and to improve utilization of the at least one first sensor and the plurality of IoT-capable devices.

In some embodiments, the IoT human interface device might further comprise the at least one first sensor, which might comprise at least one of one or more temperature sensors, one or more light sensors, one or more humidity sensors, or one or more motion sensors, and/or the like. According to some embodiments, the at least one first sensor might further comprise at least one of one or more air quality sensors, one or more carbon monoxide sensors, one or more smoke detectors, one or more water leak detectors, one or more contact sensors, one or more audio sensors, one or more proximity sensors, one or more biometrics sensors, one or more location sensors, one or more radiation sensors, one or more telecommunications signal sensors, or one or more cameras, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing Internet of Things functionality, and, in particular embodiments, to methods, systems, apparatus, and computer software for implementing Internet of Things ("IoT") human interface functionality, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

Figure 1B:
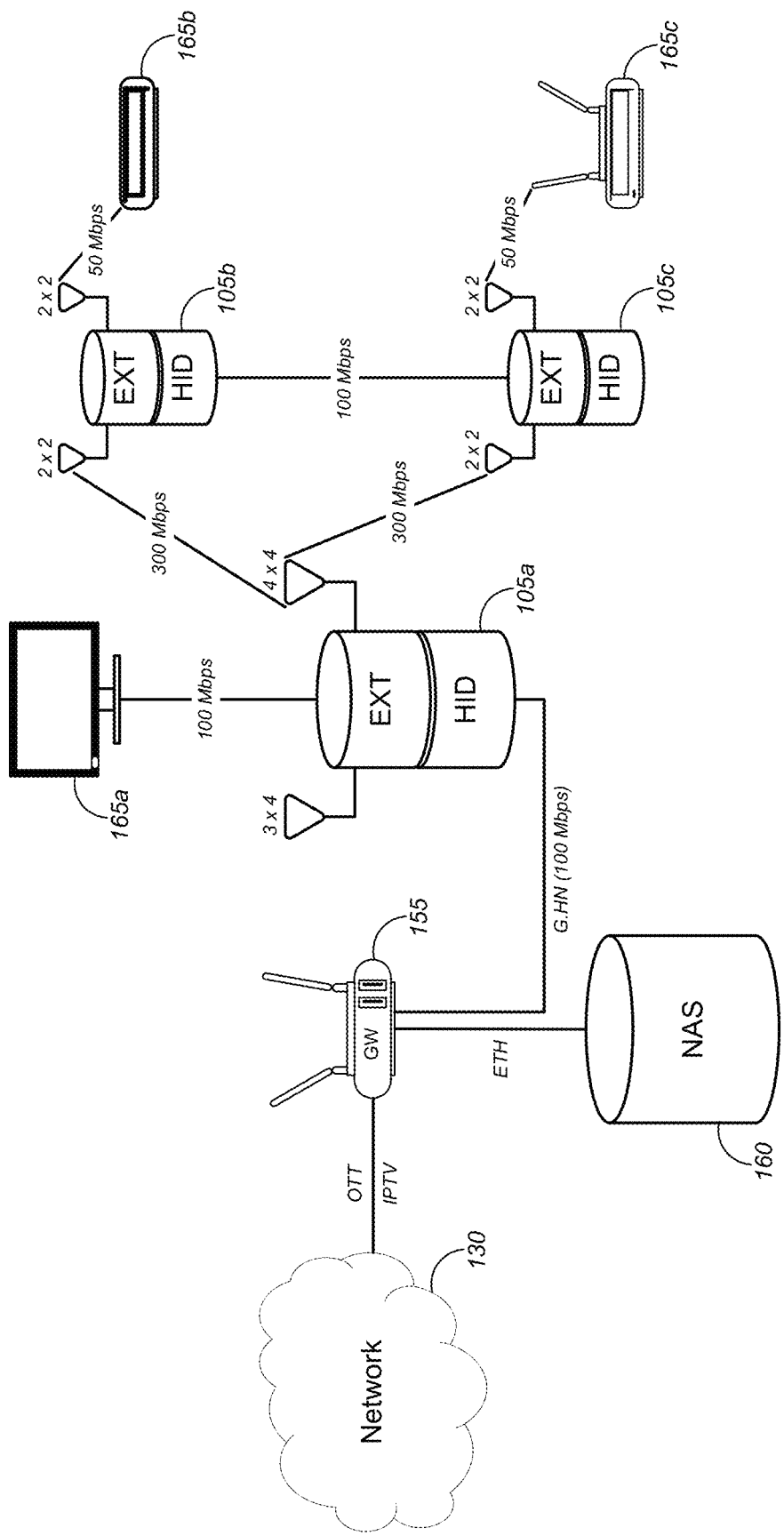

With reference to the figures, FIGS. 1A and 1B (collectively, "FIG. 1") are schematic diagrams illustrating various systems 100 and 100' for implementing Internet of Things ("IoT") human interface functionality, in accordance with various embodiments. FIG. 1A depicts a general system 100 for implementing Internet of Things ("IoT") human interface functionality, while FIG. 1B depicts a system 100' that utilizes a wireless mesh solution for implementing Internet of Things ("IoT") human interface functionality.

In the non-limiting embodiment of FIG. 1A, system 100 might include, without limitation, an IoT human interface device 105, one or more users 110a-110n (collectively, "users 110"), one or more IoT-capable sensors 115a-115n (collectively, "IoT-capable sensors 115" or "sensors 115"), and one or more IoT-capable devices 120a, 120b, through 120n (collectively, "IoT-capable devices 120" or "devices 120"), and/or the like.

In some embodiments, the IoT-capable sensors 115 might include, but are not limited to, one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras, and/or the like. In some instances, the IoT-capable devices 120 might include, without limitation, one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, or one or more exercise equipment, and/or the like. In some cases, the at least one of the one or more sensor devices and at least one IoT-capable sensor 115 might be the same device.

According to some embodiments, system 100 might further comprise a computing system 125 that may be communicatively coupled to at least the IoT human interface device 105 (and in some cases, one or more of the sensors 115 or one or more of the devices 120) via network 130 (and in some instances, via one or more telecommunications relay systems 135). In some cases, the computing system 125 might include, but is not limited to, a server computer remote from the IoT human interface device, a cloud computing system, a distributed computing system, and/or the like. In some instances, the network 130 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks. In a particular embodiment, the network 130 might include an access network of the service provider (e.g., an Internet service provider ("ISP")), or the like. The one or more telecommunications relay systems 135 might include, without limitation, one or more wireless network interfaces (e.g., wireless modems, wireless access points, and the like), one or more towers, one or more satellites, and/or the like. According to some embodiments, one or more of the IoT human interface device 105, IoT-capable sensors 115, and/or the IoT-capable devices 120 might each comprise a software-defined multiple radio device or other multiple radio device (e.g., multiple radio devices that comprise multiple physical layer chipsets or the like) that allows each of these devices to simultaneously operate in several standards and frequencies, including, but not limited to, Wi-Fi, LTE, IoT standards (like 6LowPAN, LoRa, etc.). In this manner, these devices might each serve as an access point, small cell, and IoT base, simultaneously, with the same RF transmit stage. The multiple radio device functionality and implementation are described in detail in the '7086 and '878 applications, which have already been incorporated herein by reference in their entirety.

In some embodiments, the system 100 might further comprise a data store or data lake 140 that stores information regarding the IoT human interface device 105, information regarding the IoT-capable sensors 115, information regarding the IoT-capable devices 120, information regarding communications amongst these devices and sensors, information regarding communications between each of the users 110 and the IoT human interface device 105, information regarding the network, information regarding communications between the computing system 125 and each of the IoT human interface 105, the IoT-capable sensors 115, and the IoT-capable devices 120, and/or the like. In some cases, the system 100 might further comprise an analytics engine 145 and an associated database 150 that together analyze and track (or record) communications amongst the various components of system 100 (i.e., the IoT human interface 105, the users 110, the IoT-capable sensors 115, the IoT-capable devices 120, the computing system 125, and/or the like) to identify trends as well as to identify potential issues with communications or efficiency of the system, and/or the like, the results of which might cause the computing system 125 to send software updates to affected or applicable ones of the IoT human interface 105, the IoT-capable sensors 115, the IoT-capable devices 120, and/or the like).

In operation, the user 110 might interact with the IoT human interface device 105 either via voice interaction (as shown, e.g., by the wave icons between each of the users 110 and the IoT human interface device 105, or the like) or via interaction through an app, user interface, and/or portal on the user's user device (as shown, e.g., in the embodiments of FIGS. 5A-5I, or the like). In the case of voice commands being received from the user 110, each of a plurality of microphones of the IoT human interface device might receive the voice input from the user 110, and the IoT human interface device 105 and/or a computing system 125 might identify one or more explicit commands in the voice input; might identify one or more first IoT-capable devices of the plurality of IoT-capable devices 120a-120n to which the one or more explicit commands are applicable; might receive one or more first sensor data from each of at least one first sensor of the plurality of IoT-capable sensors 115a-115n; might analyze the first voice input in view of previous voice inputs from the user and in view of the one or more first sensor data (both of which might be stored on a built-in data store or in data lake 140, etc.), to determine whether the first voice input additionally contains any implicit commands; based on a determination that the first voice input contains at least one implicit command, might identify one or more second IoT-capable devices of the one or more first IoT-capable devices to which the at least one implicit command is additionally applicable, generate second instructions for each of the one or more second IoT-capable devices, using a combination of the one or more explicit commands and the at least one implicit command, and send the generated second instructions to the one or more second IoT-capable devices; and, for each of the one or more first IoT-capable devices to which the at least one implicit command is not applicable, might generate first instructions, using the one or more explicit commands, and send the generated first instructions to the one or more first IoT-capable devices to which the at least one implicit command is not applicable; and/or the like. In some instances, the analyzing the first voice input to determine whether the first voice input additionally contains any implicit commands might comprise: determining, with the IoT human interface device 105 and/or the computing system 125, an intent of the user based at least in part on the previous voice inputs from the user and the one or more first sensor data; determining, with the IoT human interface device 105 and/or the computing system 125, a match probability that indicates a probability that the determined intent of the user matches actual intent of the user; and/or the like. In some cases, generating the second instructions might comprise: generating, with the IoT human interface device 105 and/or the computing system 125, the second instructions; compiling, with the IoT human interface device 105 and/or the computing system 125, a data structure comprising the determined intent of the user, the determined match probability, and a tagged list listing at least the one or more second IoT-capable devices; and inserting, with the IoT human interface device 105 and/or the computing system 125, the data structure in the generated second instructions; and/or the like.

The machine-to-machine communications between the IoT human interface device 105 and each of the IoT-capable sensors 115a-115n, between the IoT human interface device 105 and each of the IoT-capable devices 120a-120n are represented in FIG. 1 by the lightning bolt symbols, which in some cases denotes wireless communications (although, in some instances, need not be wireless, but can be wired communications). In some instances, each IoT-capable device of the plurality of IoT-capable devices 120a-120n and each IoT-capable sensor of the plurality of IoT-capable sensors 115a-115n might be assigned a unique IPv6 identifier or the like that enables secure and non-confused communications with particular IoT-capable devices or sensors (as no two devices or sensors will have the same identifier). In some cases, the IPv6 identifiers may be used together with other identifiers for the same device. In some instances, such identification capability can simplify device registration and/or can be used to facilitate machine-to-machine communications, machine-to-network communications, and/or the like.

In some embodiments, the IoT human interface device 105 and/or the computing system 125 might identify one or more third IoT-capable devices of the plurality of IoT-capable devices to which the at least one implicit command is applicable, the one or more third IoT-capable devices being separate from each of the one or more first IoT-capable devices and the one or more second IoT-capable devices; might generate third instructions for each of the one or more third IoT-capable devices, using the at least one implicit command; and might send the generated third instructions to the one or more third IoT-capable devices; and/or the like.

According to some embodiments, one or more application programming interfaces ("APIs") might be established between the IoT human interface device 105 and each of the IoT-capable sensors 115a-115n, and between the IoT human interface device 105 and each of the IoT-capable devices 120a-120n. The APIs facilitate communications with these IoT-capable devices, which could number in the thousands or more. In some embodiments, artificial intelligence ("AI") may be utilized in the IoT human interface device to improve interactions with the user, as well as improving machine-to-machine interactions between the IoT human interface device 105 and each of the IoT-capable sensors 115a-115n, and between the IoT human interface device 105 and each of the IoT-capable devices 120a-120n, and to improve utilization of the IoT-capable sensors 115 and the plurality of IoT-capable devices 120, and/or the like.

In the non-limiting embodiment of FIG. 1B, system 100' might comprise a plurality of IoT human interface device 105a-105c (collectively, "IoT human interface devices 105"; which might each correspond to IoT human interface device 105 as described in detail above with respect to FIG. 1A) that may be used to extend wireless connectivity throughout a home, building, or customer premises. Such devices might comprise a software-defined multiple radio device or other multiple radio device that is described in detail above and in the '7086 and '878 applications. According to some embodiments, over-the-top ("OTT") content, Internet Protocol television ("IPTV") content, or other media content might be received via network 130 by a gateway device 155 that is located at the customer premises. The gateway device 155 might communicatively couple with a network-attached storage ("NAS") device or other data storage device 160 via, e.g., an Ethernet connection or the like. A primary IoT human interface device 105a might communicatively couple with the gateway device 155 via a home networking connection or the like to receive the OTT, IPTV, or other media content, and might provide some or all of such content to each of one or more of a television 165a, a digital video recorder ("DVR") 165b, and/or a set-top box ("STB") 165c, or the like (which might correspond to the IoT-capable devices 120 of system 100 of FIG. 1A). In some cases, where the DVR 165b and/or the STB 165c might be located in different parts of the customer premises, secondary IoT human interface devices 105b and 105c, respectively, might be used to extend the wireless connectivity from the primary IoT human interface device 105a to the portions of the customer premises in which the secondary IoT human interface devices 105b and 105c are located. In some instances, the wireless connectivity might utilize one or more wireless protocols and standards including, but not limited to, Wi-Fi or other IEEE 802.11 suite of protocols, the Bluetooth™ protocol, the Z-Wave protocol, the ZigBee protocol or other IEEE 802.15.4 suite of protocols, LTE, IoT standards (e.g., 6LowPAN, LoRa, etc.), and/or any other wireless protocol, and the like. Although system 100' in FIG. 1B depicts specific configurations of various components of system 100' as well as specific examples of bandwidths or connectivity speeds, the various embodiments are not so limited, and the various components of the system 100' and other applicable components (e.g., other IoT-capable devices and sensors, other devices, and/or the like) that are not shown in FIG. 1B might be configured in communication (at any appropriate bandwidth or connectivity speed) with one or more IoT human interface devices 105, which might be coupled to the gateway device 155 either directly or indirectly, and the like without deviating from the scope of the various embodiments.

Figure 2:
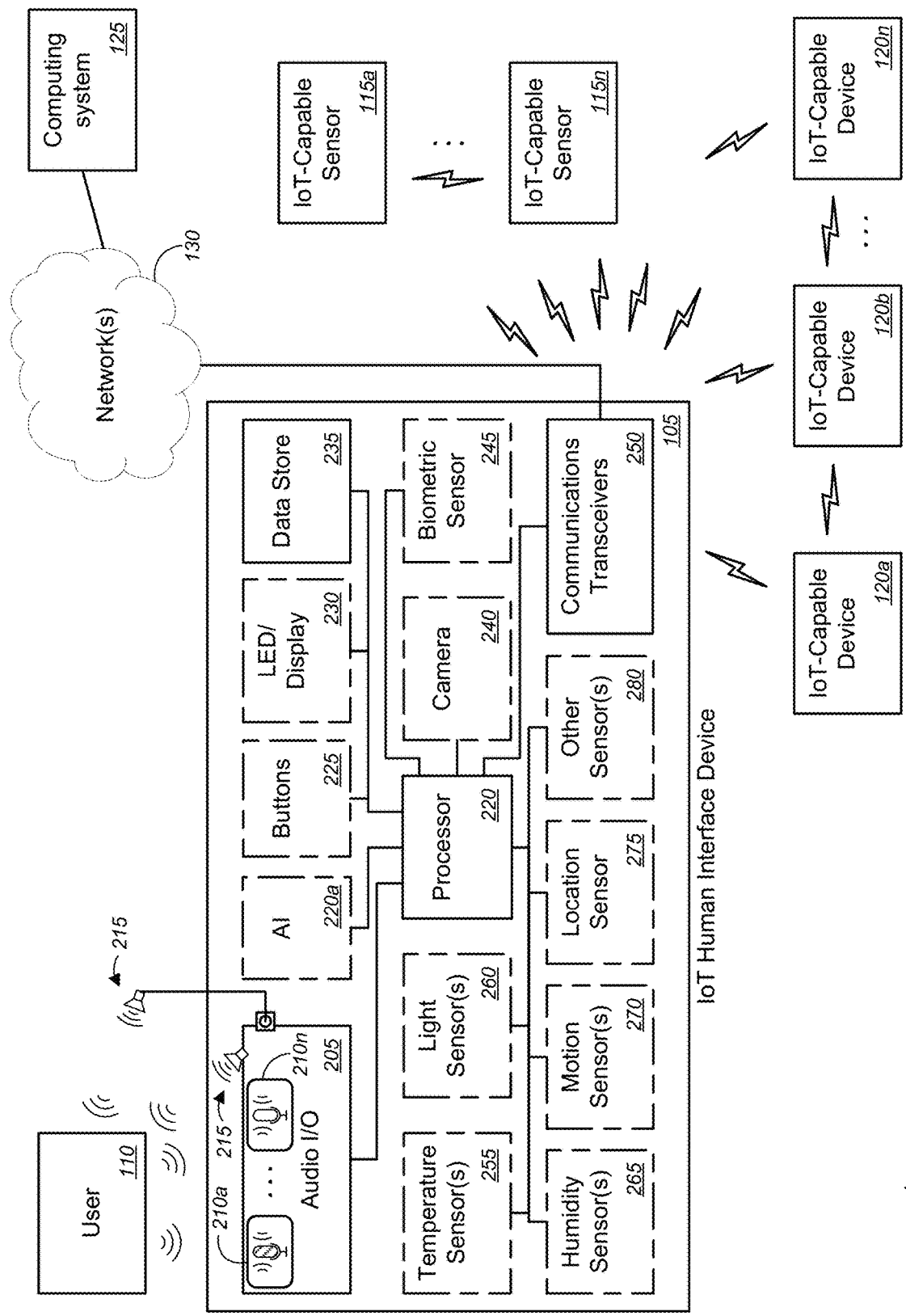
FIG. 2 is a schematic diagram illustrating another system for implementing IoT human interface functionality, in accordance with various embodiments.

FIG. 2 is a schematic diagram illustrating another system 200 for implementing IoT human interface functionality, in accordance with various embodiments. According to some embodiments, the IoT human interface device 105 might include, without limitation, an audio input/output ("I/O") device 205, one or more processors 220 (which in some cases might include an artificial intelligence ("AI") system or module), one or more buttons 225 (optional), one or more LED/display devices 230 (optional), one or more data stores or computer readable storage media 235, one or more cameras 240 (optional), one or more biometric sensors 245 (optional), one or more communications transceivers 250, one or more temperature sensors 255 (optional), one or more light sensors 260 (optional), one or more humidity sensors 265 (optional), one or more motion sensors 270 (optional), one or more location sensors 275 (optional), one or more other sensors 275 (optional), and/or the like. In some instances, the one or more other sensors 280 might include, but are not limited to, one or more air quality sensors, one or more carbon monoxide sensors, one or more smoke detectors, one or more water leak detectors, one or more contact sensors, one or more accelerometers, one or more proximity sensors, one or more radiation sensors, one or more telecommunications signal sensors, and/or the like.

The audio I/O device 205, in some cases, might include, without limitation, one or more microphones 210a-210n (collectively, "microphones 210"), one or more speakers 215 (which might be built-in speakers or external speakers connected through an audio jack or the like), one or more audio processors (not shown), and/or the like.

In operation, the user 110 might interact with the IoT human interface device 105 via the microphones 210 and the speaker(s) 215 of the audio I/O device 205. In some embodiments, the microphones 210 might comprise at least one of microelectromechanical systems ("MEMS") microphones, dynamic (or electromagnetic-induction-based) microphones, condenser (or capacitance-change-based) microphones, piezoelectric microphones, carbon microphones, ribbon microphones, fiber optic microphones, laser microphones, liquid microphones, and/or the like. The audio I/O 205 might utilize far-field voice recognition, voice distinction, or a beam forming microphone array of the plurality of microphones, or a combination of these techniques to accurately and consistently distinguish the user's voice input despite the user being distant from the IoT human interface device, despite the user's voice being low in volume, or despite the user's voice being mixed with ambient or other noises in the room or nearby, and the like. In some cases, the audio processor of the audio I/O device 205 might support voice activity detection (e.g., that used wake word detection with barge-in support, or the like), enhanced voice recognition (which might be optimized for array microphone configuration, or the like), speaker enhancement (which might include, but is not limited to, volume extension techniques, bass extension techniques, distortion protection techniques, etc.), and/or the like.

Figure 3:
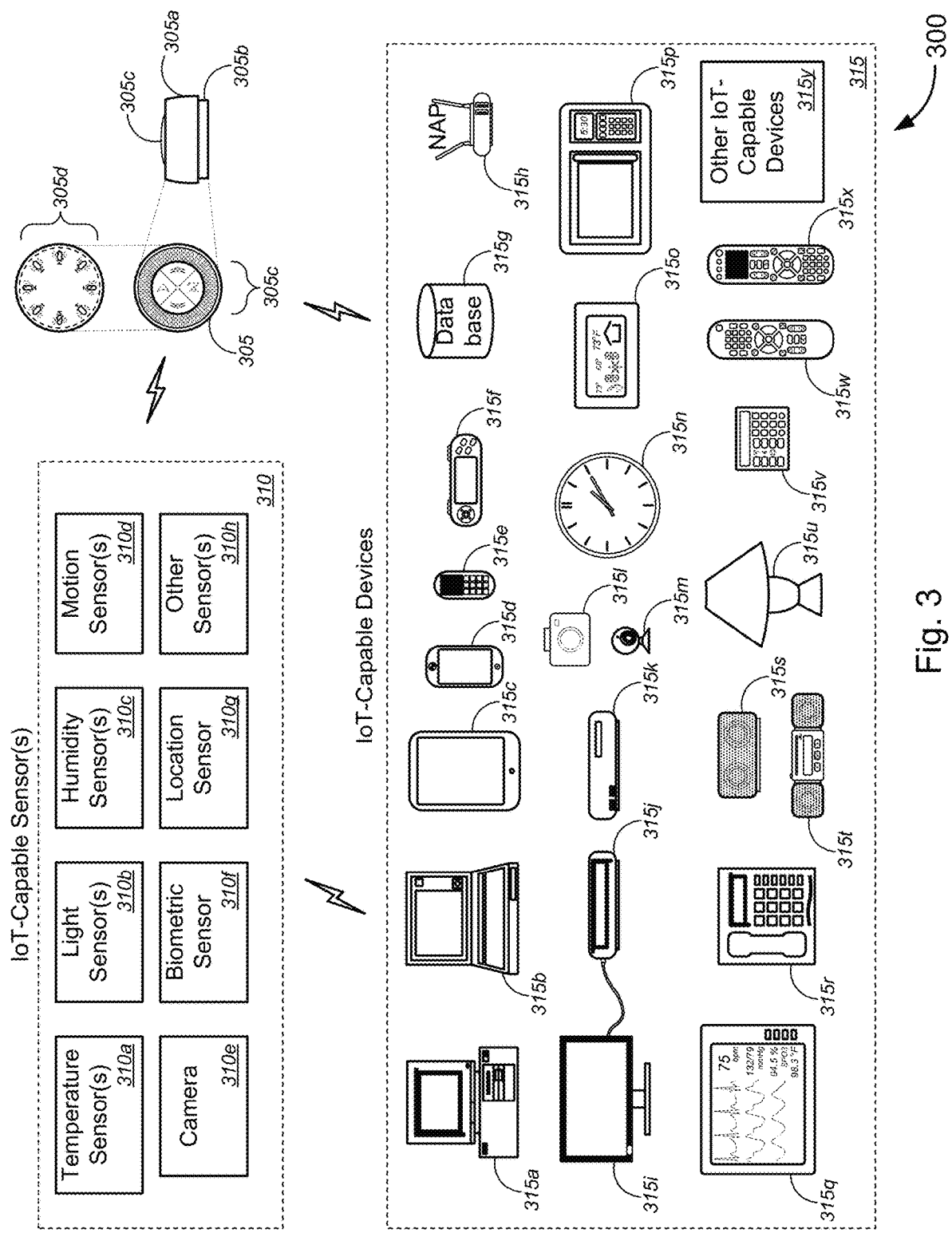
FIG. 3 is a schematic diagram illustrating yet another system for implementing IoT human interface functionality, in accordance with various embodiments.

In some embodiments, the microphones 210 might be arranged so as to be disposed within a plane that is parallel with a cylindrical base of the IoT human interface device. In some cases, each microphone of the plurality of microphones 210 might be disposed equidistant from adjacent microphones and disposed at a predetermined radius from a vertical axis that is orthogonal to a center of the cylindrical base of the IoT human interface device 105, as shown in FIG. 3 for example. Although not shown, the microphones 210 might be arranged to be disposed in two or more sets, with the microphones of the first set being disposed within a first plane that is parallel with the cylindrical base of the IoT human interface device, with the microphones of the second set being disposed within a second plane that is parallel with (yet separate from) the first plane, and so on. Each of the microphones in each set might be disposed equidistant from adjacent microphones in the same set and disposed at a predetermined radius from a vertical axis that is orthogonal to a center of the cylindrical base of the IoT human interface device 105. In some embodiments, the arrangement of the microphones in an array might enable or facilitate beamforming. According to some embodiments, the speakers 215 might be arranged to provide a 360 degree sound field, and might utilize an amplifier to enhance sound generation.

In some embodiments, the one or more buttons 225 might comprise physical buttons or soft buttons (i.e., virtual buttons on a touchscreen display), and/or the like, which might include a combination of two or more of a volume up button, a volume down button, a mute button, a left button, a right button, an up button, a down button, a menu button, an action or select button, and/or the like. According to some embodiments, the LED/Display device 230 might comprise at least one of one or more light emitting diodes ("LEDs"), an organic LED ("OLED") display, a liquid crystal display ("LCD"), a touchscreen display, and/or the like. In some cases, the LEDs might comprise multi-color, multi-purpose LEDs that may be arranged in an array, e.g., on a top (and/or side) surface of the IoT human interface device 105, or the like.

In some instances, the one or more biometric sensors 245 might include, but are not limited to, fingerprint sensors, palm print sensors, footprint sensors, handprint sensors, voice identification sensors, iris scanners, retina scanners, and/or the like. In some embodiments, the one or more communications transceivers 250 might include at least one of a WiFi transceiver(s) (with support for one or both of 2.4 GHz or 5 GHz WiFi, or the like), a Bluetooth transceiver, a Z-wave transceiver, and/or the like. In some cases, the IoT human interface device 105 might further comprise one or more batteries, or might utilize an AC-DC power adapter to connect to an electrical outlet in the customer premises, or both. In some instance, the IoT human interface device 105 might further comprise one or more data ports (including, without limitation, one or more universal serial bus ("USB") ports, one or more micro-USB ports, one or more USB-C ports, one or more other USB ports, one or more Thunderbolt ports, one or more Lightning ports, one or more MFi connectors, one or more high definition multimedia interface ("HDMI") ports, and/or the like), or the like. In some cases, the communications transceiver's 250 might provide communications (either wired or wireless) between the IoT human interface device 105 and the computing system 125 via network(s) 130, might provide machine-to-machine communications (either wired or wireless) between the IoT human interface device 105 and each of the IoT-capable sensors 115, might provide machine-to-machine communications (either wired or wireless) between the IoT human interface device 105 and each of the IoT-capable devices 120, and/or the like.

In some embodiments, the IoT human interface device 105 might provide one or more of the following basic voice functionalities: support a variety of future voice services; enable IoT stack-enabled voice interface; control functionalities/devices in a customer premises; respond to user questions; announce news headlines; announce sports scores; play high-quality music; provide voice activated smart speaker functionality; and/or the like. According to some embodiments, the IoT human interface device 105 might provide one or more of the following improved or advanced voice functionalities: provide speaker and microphone functionalities with far-field voice recognition with microphone beam-forming; enable capturing a particular user's voice from across a room even during music playback; enable accurately picking out a particular user's voice even when the user is far from the IoT human interface device 105 and is speaking at a normal volume in a noisy room; enable selection between hands-free, always on, always listening functionality or push-to-talk/push-to-listen functionality; enable functionality of push-to-talk apps from mobile devices; provide hardware and software that are optimized for far-field stationary home use; enable voice activity detection (e.g., bare-in support that utilizes a "finger printing" (or voice printing) of a wake-up word or phrase, etc.); enable enhanced voice recognition that is optimized for array microphone configuration (which might include auto-tuning to a room to learn voices and ambient noises, etc.); provide speaker enhancement (e.g., volume extension (e.g., small speaker tuning), bass extension, distortion protection (e.g., noise cancellation), etc.); and/or the like.

According to some embodiments, the IoT human interface device 105 might provide one or more of the following operations: autonomous, machine-to-machine software/firmware updates; remote login and control; system health/remote alarm functionalities; and/or the like. In some cases, the IoT human interface device 105 might provide one or more of the following functionalities: provide smart home control or lifestyle automation and query (that covers thousands of devices or more); provide cloud intelligence (e.g., ability to support local and remote sites, etc.); provide improved WiFi connectivity with beam forming antennas; enable IoT stack universal apps (including, but not limited to, setup apps, control apps, configuration apps, user automation apps, etc.); enable "out-of-box" experience (e.g., by utilizing automated initial set-up or configuration, by utilizing bar-code-based initial set-up or configuration, etc.); provide live resiliency (that enables functionality in case of dropped or no network connectivity); provide live view (that provides automatic updates in real-time); provide live sync (that provides a common view for multiple users); provide live aware or awareness (that provides status of network elements and provides proactive solutions to anticipated or current network issues or problems); utilize IoT stack automation engine (that allows quick and easy creation of virtually any kind of automation task, that makes available as both a trigger and an action any functionalities of any IoT-capable device, that enables end users to add innovative new use cases, etc.); provide IoT stack system for app and systems external development (that provides fully customizable apps and user interfaces, that enables robust API/protocol abstraction, that provides a developer program kit, that enables any-platform support (i.e., that makes the IoT human interface device agnostic to systems, platforms, and IoT-capable devices, etc.), etc.; provide security (e.g., AES 256-bit encryption capability or better, OAuth 2.0 or better for client authentication, security enhancement (e.g., LED lights flash red when the fire alarm goes off, etc.)), etc.; provide voice security (e.g., using network address translation ("NAT") for devices, provide security for IoT apps and API, enable ability to lock the system so no changes can be made, enable parental control functionalities, enable voice authentication via texted security code, etc.); and/or the like. Herein, "IoT stack" might refer to a management or coordination engine that could be embodied within the computing system 125, within the IoT human interface device 105, within a cloud computing system (not shown), within a distributed computing system, and/or the like. The IoT stack handles, coordinates, and/or manages IoT communications and interactions amongst a plurality of IoT-capable devices and sensors (and, in some instances, all IoT devices within the customer premises or local network; or, in other cases, all IoT devices within a service provider's network covering a plurality of customer premises and subscribers/users) that are communicatively coupled to the service provider network that is associated with the IoT stack and/or to any network with which the IoT stack is in communication. In some embodiments, quantum security methods may be utilized to protect data and user privacy.

In some embodiments, the IoT human interface device 105 might provide one or more of the following additional functionalities: provide condition-based action functionalities (e.g., utilizing if-this-then-that-logic, etc.); enable learning intent parsing (that determines user intent, matches possibility/probability levels, and provides tag listing of devices); provide desktop as a service functionality; provide software as a service functionality; enable one touch/button functionality for adding new IoT-capable devices; store historical data (including, but not limited to, how long the connection has been up in the last day, last 10 days, etc.; signal strength; protocol used by each device; etc.) from each IoT-capable device in a built-in large cache or solid state hard drive; enable bulk uploading of information into cloud storage for off-hours download of data from all IoT-capable devices in the network; support all IoT protocols (including, but not limited to, MQTT, CoAP, AMQP, XMPP, etc.); provide ability to block one or more IoT-capable devices from communicating with the IoT-human interface device; support more than 250 IoT-capable devices at a time; and/or the like.

Merely by way of example, in some embodiments, the IoT human interface device 105 might provide voice over Internet Protocol ("VoIP") functionality, in some cases, using a voice interface rather than a numeric keypad interface or the like to establish or connect a call using VoIP, or the like. In some cases, the IoT human interface device 105 might utilize active authentication as a security measure prior to following commands by the user. In such cases, the IoT human interface device 105 (or an AI module thereof) might learn how a particular user interacts with one or more devices—e.g., word usage, phrase usage, keystroke patterns, etc. —, and might block user access if subsequent interaction is determined to be different (i.e., determined to be by someone other than the purported user), and/or the like. Other security measures might include, but are not limited to, utilizing security mode interaction with other devices, utilizing voice recognition, voice input, or other authentication to open/unlock doors, and/or the like.

According to some embodiments, mood sensing might be utilized. For example, audio sensors might detect certain vocal tones, intonations, words, non-verbal sounds (e.g., grunts, snorts, hissing, whimpering, weeping, etc.), and/or the like that might be indicative of the mood of the user (i.e., indicative of the user being angry, belligerent, sad, afraid, etc.) and/or cameras might capture physical or bodily reactions of the user (e.g., knuckle-cracking, teeth-clenching, stomping, pacing, huddled, crying, etc.) that might likewise be indicative of the mood of the user. In some instances, based on such mood sensing, the IoT human interface device might communicate with IoT-capable devices in an attempt to help the user (e.g., to calm the user, to assure the user, etc.) or to warn others from approaching the user (e.g., by locking the door to the user's office, by sending communications to other people's user devices, by displaying an electronic "do not disturb" sign on the door or by the door to the user's office, etc.).

The IoT human interface 105, the user 110, the IoT-capable sensors 115, the IoT-capable devices 120, the computing system 125, and the network 130 of system 200 in FIG. 2 are otherwise similar, if not identical, to the IoT human interface 105, the users 110, the IoT-capable sensors 115, the IoT-capable devices 120, the computing system 125, and the network 130, respectively, of system 100 in FIG. 1, and the descriptions of these components of system 100 are applicable to the corresponding components of system 200.

FIG. 3 is a schematic diagram illustrating yet another system 300 for implementing IoT human interface functionality, in accordance with various embodiments. In particular, FIG. 3 depicts various examples of IoT-capable sensors 310 and various examples of IoT-capable devices 315 with which the IoT human interface device 305 communicates. Some IoT-capable sensors 310, in some cases, also communicate with some IoT-capable devices 315. Although lightning bolt symbols are used to denote wireless communications between two or more of the IoT human interface device 305, the IoT-capable sensors 310, and the IoT-capable devices 315, the various embodiments are not so limited, and wired as well as wireless communications may be used. In any event, most communications would be autonomous machine-to-machine communications. In some embodiments, the IoT human interface device 305 might include, without limitation, a body or housing 305a (as shown in a side view beside the top or plan view in FIG. 3), a base 305b, a physical interface portion 305c (including soft buttons or physical buttons, which might include, but are not limited to, an action button, a left button (or volume down button), a right button (or volume up button), a mute button, and/or the like). According to some embodiments, an array of microphones or audio sensors 305d might be provided that might line in a plane parallel to the base 305b of the IoT human interface device 305 (as shown, e.g., in the partial cut-out top or plan view above the top or plan view in FIG. 3). Slots might be provided on the top and/or side portions of the housing 305a to allow sound access to the microphones (as shown by the radial slots on the top portion of the IoT human interface device that radiate from the outer edge of the physical interface portion 305c to an outer diameter of the housing 305a in FIG. 3), and also to permit sound emission by internal speakers. Alternative to slots, holes or sound-permeating materials may be used to allow sound access to the microphones (and also to permit sound emission by internal speakers).

According to some embodiments, the IoT-capable sensors 310 might include, without limitation, one or more temperature sensors 310a (e.g., heat sensors, infrared sensors, thermometers, etc.), one or more light sensors 310b (e.g., ambient light sensors, luminosity sensors, illuminance sensors, etc.), one or more humidity sensors 310c, one or more motion sensors 310d, one or more cameras 310e, one or more biometric sensors 310f (e.g., fingerprint sensors, palm print sensors, footprint sensors, handprint sensors, voice identification sensors, iris scanners, retina scanners, etc.), one or more location sensors 310g (e.g., global positioning system ("GPS") devices, global navigation satellite system ("GNSS") devices, other location sensors, etc.), one or more other sensors 310h, and/or the like. In some cases, the one or more other sensors 310h might include, but are not limited to, one or more air quality sensors, one or more carbon monoxide sensors, one or more smoke detectors, one or more water leak detectors, one or more contact sensors, one or more audio sensors, one or more accelerometers, one or more proximity sensors, one or more radiation sensors, one or more telecommunications signal sensors, and/or the like.

In some embodiments, the IoT-capable devices 315 might include one or more IoT-capable sensors 310 and/or might further include, without limitation, a desktop computer 315a, a laptop computer 315b, a tablet computer 315c, a smart phone 315d, a mobile phone 315e, a portable gaming device 315f, a database or data storage device 315g, a network access point ("NAP") 315h, a television or monitor 315i, a set-top box ("STB") 315j, a gaming console 315k, an image capture device 315l, a video capture device 315m, a time piece 315n (including, without limitation, a clock, a watch, or other time piece, and the like), a thermostat or environmental control system 315o, a kitchen appliance 315p (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device 315q, a telephone system 315r, a speaker 315s, a media recording and/or playback device 315t, a lighting system 315u, a customer premises security control system 315v, one or more dedicated remote control devices 315w, one or more universal remote control devices 315x, and/or other IoT-capable devices 315y. In some cases, the other IoT-capable devices 315y might include, without limitation, a personal digital assistant, a fitness tracking device, a printer, a scanner, an image projection device, a video projection device, a household appliance, a vehicle, an audio headset, earbuds, virtual reality goggles or headset, augmented reality goggles or headset, a door locking system, an automated door opening/closing system, a window locking system, an automated window opening or closing system, a window covering control system, a smart window, a solar cell or solar cell array, an electrical outlet or smart node, a power strip or bar, a dimmer switch, a data port, a sprinkler system, exercise equipment, and/or the like.

The IoT human interface device 305, the IoT-capable sensors 310, and the IoT-capable devices 315 are otherwise similar, if not identical, to the IoT human interface device 105, the IoT-capable sensors 115, and the IoT-capable devices 120, respectively, as described above with respect to FIGS. 1 and 2.

Figure 4A:
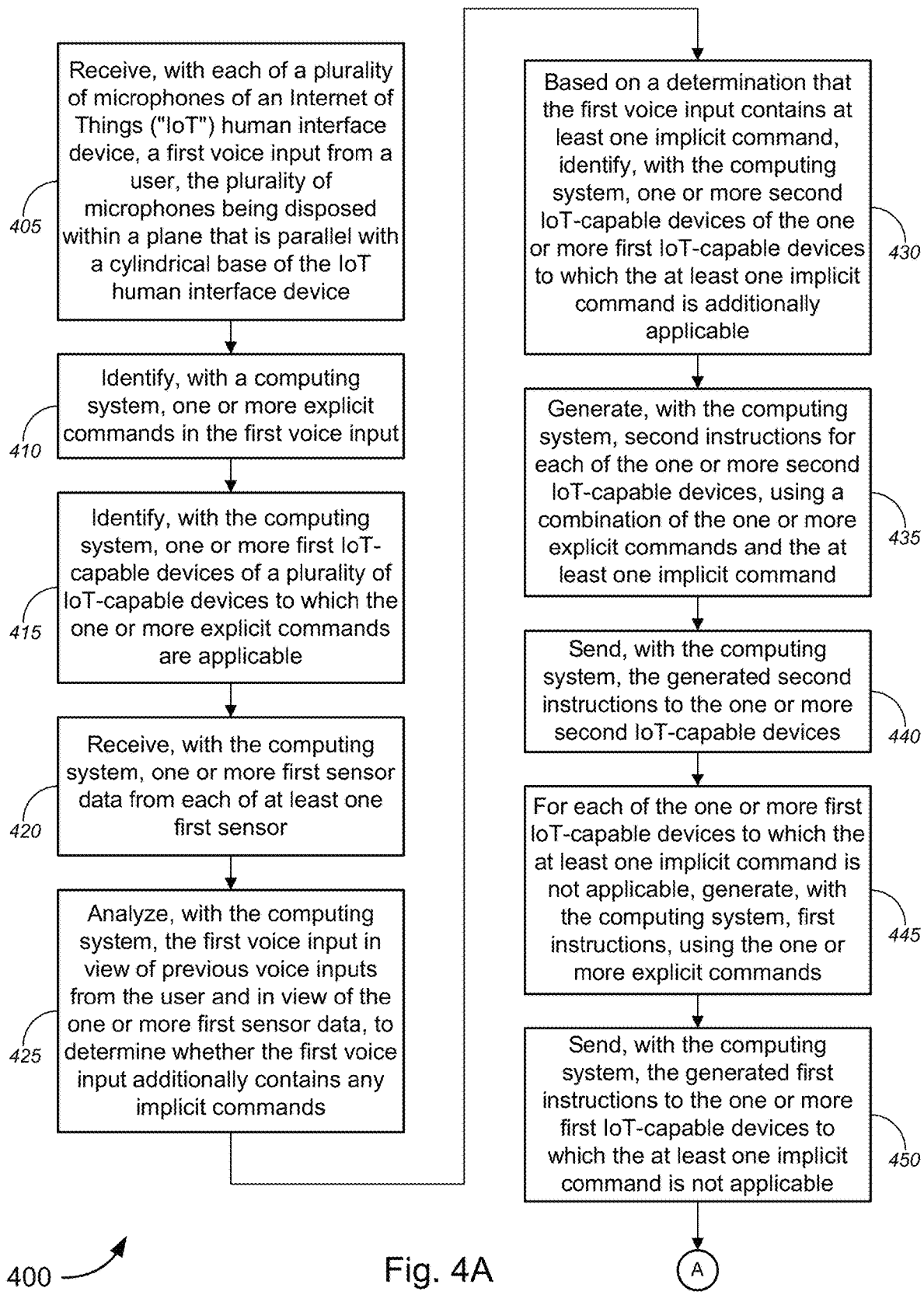
FIGS. 4A-4C are flow diagrams illustrating a method for implementing IoT human interface functionality, in accordance with various embodiments.
Figure 4B:
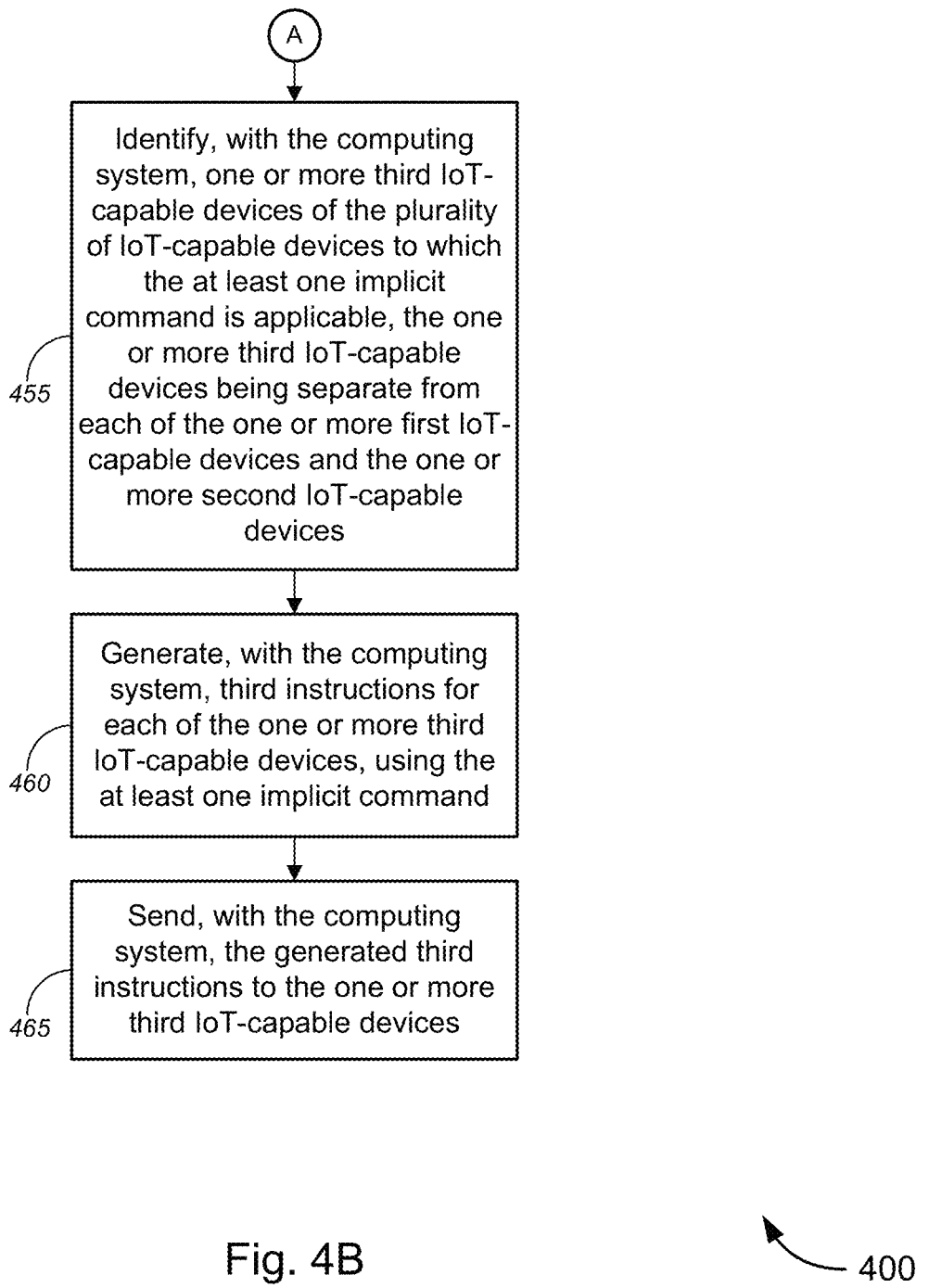
Figure 4C:
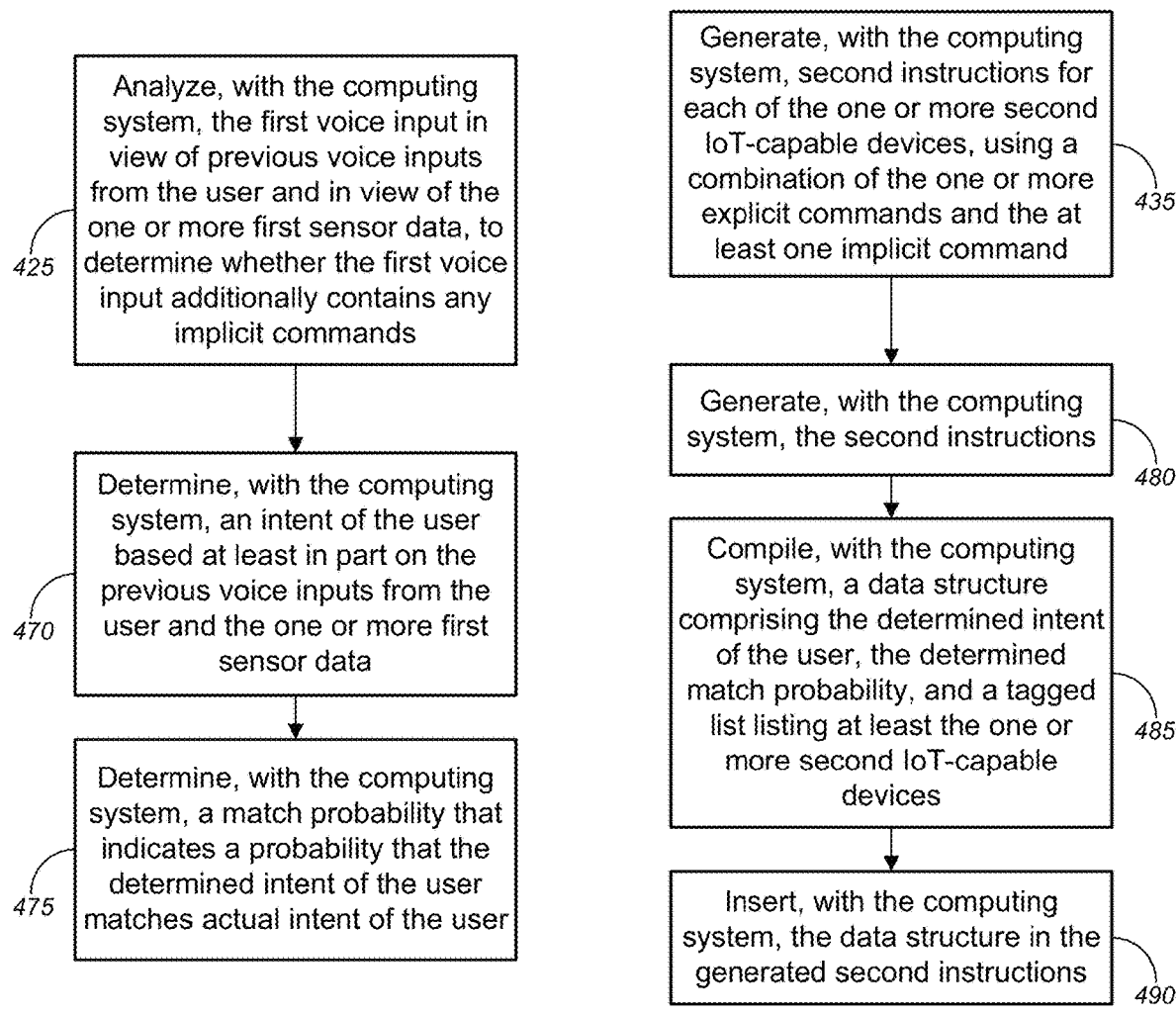

FIGS. 4A-4C (collectively, "FIG. 4") are flow diagrams illustrating a method 400 for implementing IoT human interface functionality, in accordance with various embodiments. While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3 respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In FIG. 4A, method 400, at block 405, might comprise receiving, with each of a plurality of microphones of an Internet of Things ("IoT") human interface device, a first voice input from a user. The plurality of microphones might be disposed within a plane that is parallel with a cylindrical base of the IoT human interface device (as shown, e.g., in the partial cutout view of the IoT human interface device 305 of FIG. 3, or the like). At block 410, method 400 might comprise identifying, with a computing system, one or more explicit commands in the first voice input. In some embodiments, the computing system might include, without limitation, one of a single processor disposed within the IoT human interface device, a plurality of processors disposed within the IoT human interface device, a server computer remote from the IoT human interface device, a cloud computing system, a distributed computing system that integrates computing resources from two or more IoT-capable devices of the plurality of IoT-capable devices, or a combination of two or more of these computing systems, and/or the like.

Method 400 might further comprise identifying, with the computing system, one or more first IoT-capable devices of a plurality of IoT-capable devices to which the one or more explicit commands are applicable (block 415). In some embodiments, the plurality of IoT-capable devices are separate from the IoT human interface device, and the plurality of IoT-capable devices might include, without limitation, at least one of one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, or one or more exercise equipment, and/or the like.

In some cases, the method 400, at block 420, might comprise receiving, with the computing system, one or more first sensor data from each of at least one first sensor. According to some embodiments, the at least one first sensor might include, but are not limited to, at least one of one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras, and/or the like.

At block 425, method 400 might comprise analyzing, with the computing system, the first voice input in view of previous voice inputs from the user and in view of the one or more first sensor data, to determine whether the first voice input additionally contains any implicit commands. Method 400 might further comprise, based on a determination that the first voice input additionally contains at least one implicit command, identifying, with the computing system, one or more second IoT-capable devices of the one or more first IoT-capable devices to which the at least one implicit command is additionally applicable (block 430), generating, with the computing system, second instructions for each of the one or more second IoT-capable devices, using a combination of the one or more explicit commands and the at least one implicit command (block 435), and sending, with the computing system, the generated second instructions to the one or more second IoT-capable devices (440). Method 400 might further comprise, for each of the one or more first IoT-capable devices to which the at least one implicit command is not applicable, generating, with the computing system, first instructions, using the one or more explicit commands (block 445), and sending, with the computing system, the generated first instructions to the one or more first IoT-capable devices to which the at least one implicit command is not applicable (block 450). The process then proceeds to block 455 in FIG. 4B, following the circular marker denoted, "A."

Turning to FIG. 4B, method 400, at block 455, might comprise identifying, with the computing system, one or more third IoT-capable devices of the plurality of IoT-capable devices to which the at least one implicit command is applicable, the one or more third IoT-capable devices being separate from each of the one or more first IoT-capable devices and the one or more second IoT-capable devices. Method 400 might further comprise generating, with the computing system, third instructions for each of the one or more third IoT-capable devices, using the at least one implicit command (block 460), and sending, with the computing system, the generated third instructions to the one or more third IoT-capable devices (465).

Here, the process at block 415 identify all the IoT-capable devices to which the one or more explicit commands are applicable (i.e., the first IoT-capable devices). The processes at blocks 445 and 450 generate first instructions (using only the one or more explicit commands) for the IoT-capable devices to which implicit commands are not applicable (which might be referred to herein as "explicit-only command-type IoT-capable devices"), and send the generated first instructions to the explicit-only command-type IoT-capable devices. Processes at blocks 425-440 identify one or more second IoT-capable devices among the first IoT-capable devices to which at least one implicit command is additionally applicable (which might be referred to herein as "explicit and implicit command-type IoT-capable devices"), generate second instructions (using a combination of the one or more explicit commands and the at least one implicit commands), and send the generated second instructions to the explicit and implicit command-type IoT-capable devices (or the one or more second IoT-capable devices). Processes at blocks 455-465 identify one or more third IoT-capable devices among the plurality of IoT-capable devices that are not the first or second IoT-capable devices (which might be referred to herein as "implicit-only command-type IoT-capable devices"), generate third instructions (using only the at least one implicit commands), and send the generated third instructions to the implicit-only command-type IoT-capable devices. Herein, the terms "explicit-only command-type IoT-capable devices," "explicit and implicit command-type IoT-capable devices," "implicit-only command-type IoT-capable devices" are applicable to IoT-capable devices for particular voice inputs or commands from the user, and may be assigned to other IoT-capable devices (as appropriate) for other voice inputs or commands.

A non-limiting example of using intent analysis to interpret voice commands might be as follows: when the user says, for example, "lights on," and the inbuilt light sensors or IoT-capable sensor (which might be a light sensor) detects that the ambient light in the room is dim or dimming (and perhaps if machine-to-machine communication with an IoT-capable clock or weather station indicates that sunset will be soon or that cloud cover might very likely cover a crescent moon this evening, or the like), the computing system might analyze the "lights on" command in view of the sensor data from the light sensor(s) (and/or the clock or weather station, etc.) to generate (and send to the lights in the room) a command to either turn on the lights or to increase the lumen levels of lights that may already be on but dim, via a dimmer switch or the like. In some embodiments, the lights might be turned on, or turned up, to a lumen level that the user previously consistently used over time. In some cases, the computing system might take room lighting levels as detected by the light sensors to change the lumen levels of the lights as the sun is setting (for example, when the sun has not yet set, the lumen levels of the lighting systems might be set at a mid-range level; when the sun is setting, the west windows might let in more light as the sun is closer to the horizon, and the lumen levels of the lighting systems in the room might be set to a low level and/or the window coverings might be instructed to lower; when the sun has set or is near setting, and the outside lighting has dimmed or is dimming, the lumen levels of the lighting systems might be set at a higher level (and the window coverings might be raised or lowered consistent with what the user usually commands at or around that time of day); and so on). In other words, the use of sensor data from built-in sensors and/or IoT-capable sensors that are external to the IoT human interface device (not limited to light sensors, but including any one or more of the sensors listed above, or the like) adds more fidelity to what the command actually means or is intended to mean by the particular user.

In another non-limiting example, heat sensors or cameras might detect that the user is shivering or is cold or is putting on more layers of clothing, which might result in the computing system instructing the IoT-capable thermostat to turn up the temperature (and, if one or more windows or doors are open, to instruct the window opening/closing system to close the open windows and to instruct the door opening/closing system to close the open doors, and so on). Here, the user input is not a verbal user input, but body language or body movement. In other words, instead of receiving the user voice input (as at block 405) and interpreting the voice input (at blocks 410, 425, etc.), the user input may include non-verbal user input or a combination of verbal and non-verbal user input. For example, the user might ask "what is the temperature?" while shivering or putting on more layers of clothing, and the combination of verbal and non-verbal user input might result in the computing system interpreting the intent of the user (i.e., to turn up the temperature, etc.) and instructing the IoT-capable thermostat to turn up the temperature (and, if one or more windows or doors are open, to instruct the window opening/closing system to close the open windows and to instruct the door opening/closing system to close the open doors, and so on).

With reference to FIG. 4C, analyzing the first voice input to determine whether the first voice input additionally contains any implicit commands (at block 425) might, in some cases, comprise determining, with the computing system, an intent of the user based at least in part on the previous voice inputs from the user and the one or more first sensor data (block 470) and determining, with the computing system, a match probability that indicates a probability that the determined intent of the user matches actual intent of the user (block 475). Generating the second instructions (at block 435) might, in some instances, comprise generating, with the computing system, the second instructions (block 480), compiling, with the computing system, a data structure comprising the determined intent of the user (from block 470), the determined match probability (from block 475), and a tagged list listing at least the one or more second IoT-capable devices (from block 430) (block 485), and inserting, with the computing system the data structure in the generated second instructions (block 490). According to some embodiments, the computing system might comprise an intent parser (which might include a software library or the like) that converts natural language speech or user voice input into machine readable data structures. In some cases, the intent parser might review the natural language speech or voice input and output a data structure that includes the intent of the user, a match probability, and a tagged list of entities. In some instances, the intent parser might also perform learning functions, which builds a confidence level for standard commands and learns the user's or users' natural language speech. In some embodiments, the intent parser might also be able to differentiate one user from other users. Such differentiating functionality combined with voice fingerprinting, the intent parser can, in some cases, "hear" the same command from two different users and act according to what each user actually intended (which could be different). For example, a parent and a teenaged child might issue the same command, "lights on," to the IoT human interface device. Based on past commands from each user, the intent parser might interpret that command to mean that the lights should be at a first lumen level when the parent issues the voice command, while the lights should be at a second lumen level (that is less than the first lumen level) when the teenaged child issues the same voice command. Other commands, including, but not limited to, "I'm home," "Turn on TV," "Play music," or the like, might be interpreted by the intent parser to mean different things to different users. For instance, the intent parser might interpret "I'm home" to mean "turn on lights to first lumen level, turn on soothing music in the background, open closed curtains over windows that overlook a peaceful sunset scene, etc." when the parent issues the command, but to mean "turn on lights to second lumen level, turn on top 40 music video in the background, close the curtains, display messages and postings on social media, etc." when the teenaged child issues the command. Likewise, "Turn on TV" might be interpreted by the intent parser to mean "turn on the news" for the parent, while it might be interpreted by the intent parser to mean "turn on the latest trending reality TV show" for the teenaged child. Similarly, "Play music" might be interpreted by the intent parser to mean "play some 80s and 90s music" when the parent issues the command, while it might be interpreted by the intent parser to mean "play some music from the latest top 100 list." And so on.

According to some embodiments, analyzing, with the computing system, the first voice input comprises analyzing, with the computing system, the first voice input utilizing artificial intelligence ("AI") to improve interactions with the user. The AI may be further utilized to improve machine-to-machine interactions and to improve utilization of the at least one first sensor and the plurality of IoT-capable devices.

FIGS. 5A-5I (collectively, "FIG. 5") are illustrations of user devices 500 used by users that present exemplary graphical user interfaces for implementing IoT human interface functionality, in accordance with various embodiments. In FIG. 5, each user device 500 might comprise a housing 505 and a display screen 510. Display screen 510 might include a touchscreen device, a non-touchscreen device, and/or a combination in which some portions are touchscreen-capable while other portions are not touchscreen-capable. In some embodiments, the user device 500 might serve as a device-aware IoT touchscreen remote controller that changes the screen and user interface based on a determination of which IoT device it is pointed at or associated with. For example, if the user device 500 is pointing at a television (e.g., an IoT-capable television or the like), the user device might determine that it is pointing at the television and the user interface might automatically change to present a television remote controller user interface (either a universal remote controller user interface or a remote controller user interface that is specific to or otherwise customized for the particular television it is pointing at, etc.). In another example, if the user device 500 is pointing at the kitchen, it might determine that multiple kitchen devices (e.g., multiple IoT-capable kitchen appliances, such as a coffee maker, a toaster, etc.) are intended to be controlled, and might present a customized or customizable user interface that incorporates functionalities of the various kitchen devices (e.g., user interface options for the coffee maker combined with user interface options for the toaster, etc.). Although FIG. 5 depicts user device 500 as being a smart phone, the various embodiments are not so limited, and the user device 500 can be any suitable user device, including, but not limited to, a tablet computer, a smart phone, a mobile phone, a personal digital assistant, a fitness tracker, a smart watch, a laptop computer, a desktop computer, and/or the like.

Figures 5D, 5E, 5F:
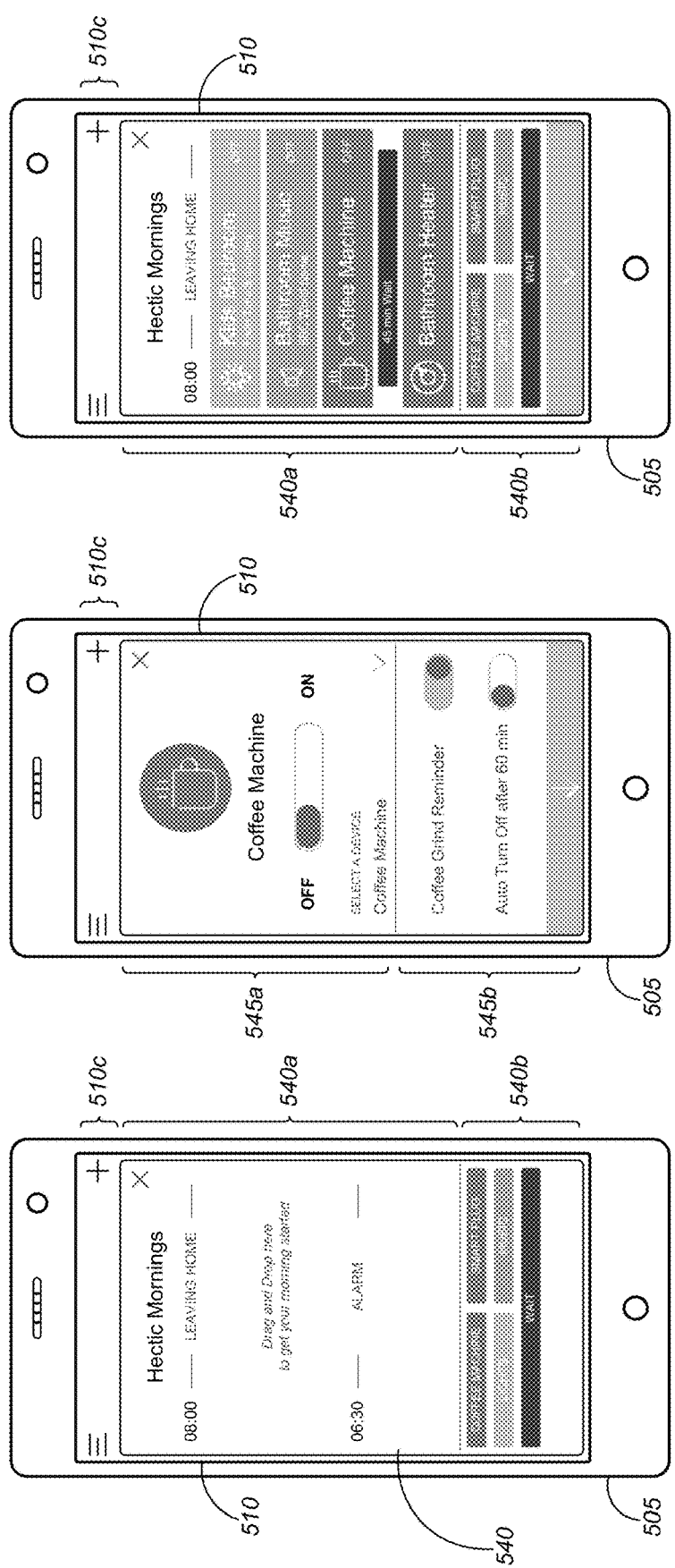

FIGS. 5A-5C depict user interfaces for creating tasks and scenes that allow the user to input preferences for how the user would like various IoT-capable devices to function under certain conditions or in response to certain triggers, while FIGS. 5D-5F depict alternative user interfaces that allow the user to input preferences for how the user would like various IoT-capable devices to function under certain conditions or in response to certain triggers, and FIGS. 5G-5I depict user interfaces that provide the user with information (including current, up-to-date information) regarding the various IoT-capable devices (and other devices) within the customer premises. In some embodiments, the IoT stack (as described in detail above) might utilize the user preferences indicated by the user in its interactions with the user interfaces in FIGS. 5A-5I to generate commands for the appropriate or applicable IoT-capable devices, and to send such generated commands to these devices. The IoT stack might also track the status of each device and might display some or all of these statuses in the user interfaces, or the like.

Turning to FIGS. 5A-5C, the user interface might comprise a header portion that provides the user with options to return to a previous screen (i.e., "Back," or the like), provides the user with a title or summary of the currently displayed screen (e.g., "Create Task," "Devices & Rooms," or "Create Scene," etc.), and provides the user with options to indicate that the selections for the current screen are complete (i.e., "Done," or the like).

FIG. 5A depicts a user interface panel 515a that allows the user to create a task, which allows the user to indicate what he or she would like to do, how the user would like the task to be triggered, when (and how often) the user would like the task to be performed, and/or the like. In each sub-panel, the user may be provided with additional options (i.e., when the user selects the menu icon in each sub-panel, or the like). FIG. 5B depicts a user interface panel 515b that allows the user to sort by Devices or by Rooms (as indicated by the sub-header portion 520). Under the Rooms view (as indicated by the dark-lettered "Rooms" and the dark line under the sub-header "Rooms"), sub-panels 525a-525c (which represent rooms in the customer premises) allow the user to select whether certain IoT-capable devices (e.g., lamps, door locks, powernodes, etc.) are turned on or off, unlocked or locked, etc. FIG. 5C depicts a user interface panel 515c that allows the user to create a scene, which allows the user to select devices to include in the scene, to indicate whether the particular device is currently on or off as well as the status of the particular device (e.g., the current brightness of a lamp, or the like) as shown in sub-panel 530a. Sub-panel 530b, for example, indicates that a powernode in the kitchen is currently off.

FIGS. 5D-5F depict a different embodiment of the header—i.e., header 510c, which might include a menu option and an add function (which might allow the user to add a new task or scene to be created). FIG. 5D depicts a panel 540 that comprises a sub-panel portion 540a that indicates a task or scene, with start times for triggering tasks (e.g., "08:00—leaving home," "06:30—alarm," etc.) and a sub-panel portion 540b that includes various task icons that can be dragged and dropped under each of the start times (which can be from the default start times, can be modified based on default start times, or can be user-added start times). For each task that can be dragged and dropped, options might be provided for selecting a device, for setting options for turning the devices on or off, for selecting options for turning on or off reminders for certain manual tasks, for setting options for timers to turn on or off the device after a predetermined period, and/or the like. For example, in the embodiment of FIG. 5E, the user can set options for a coffee machine to turn off the machine after 60 minutes and to set a reminder to the user regarding the coffee grinder (as shown in sub-panels 545a and 545b). FIG. 5F depicts an example of sub-panel 540a that has been filled by the user (e.g., when leaving home at 8 a.m., turn off the kids' bedroom light (with fade time of 3 minutes), turn off bathroom music that is set to BBC World News, turn off coffee machine, wait 45 minutes then turn off bathroom heater, etc.). A check-mark button at the bottom of sub-panel 540b allows the user to set or save the settings in sub-panel 540a.

In some embodiments, the user interface might provide the user with information regarding the various IoT-capable devices (as well as other devices) within the customer premises, and might provide the user with information about the network upload and download bandwidth and other network information, in addition to providing the user with options associated with such devices and with the network settings, as shown, e.g., in FIGS. 5G-5I. FIGS. 5G-5I depict yet another embodiment of the header—i.e., header 510d, which might include a menu option, "Overview" view, "Network" view, "Parental Controls" view, and/or the like.

The embodiment of FIG. 5G depicts an "Overview" view in which router information is displayed in sub-panel 550a. In some cases, the router information might include, without limitation, average download bandwidth, bit rate, or speed (hereinafter, referred to simply as "bandwidth") within a predetermined period (e.g., 89 Mbps, as denoted by the numeric value within the gauge icon and as denoted by the download gauge in the non-limiting example in FIG. 5G), maximum actual download bandwidth within a predetermined period (e.g., 92 Mbps, as denoted by the dot in the gauge icon and the numeric value beside the dot in the example of FIG. 5G), subscribed download bandwidth within a predetermined period (e.g., 100 Mbps, in the example of FIG. 5G), average upload bandwidth within a predetermined period (e.g., 36 Mbps, as denoted by the numeric value within the gauge icon and as denoted by the upload gauge in the non-limiting example in FIG. 5G), maximum actual upload bandwidth within a predetermined period (e.g., 39 Mbps, as denoted by the dot in the gauge icon and the numeric value beside the dot in the example of FIG. 5G), subscribed upload bandwidth within a predetermined period (e.g., 50 Mbps, in the example of FIG. 5G), router information (e.g., make, model, serial number, etc.), information indicating secure or unsecure network (e.g., as denoted by the lock symbol above the router icon in FIG. 5G, and/or the like. Sub-panel 550b might display icons of devices (including IoT-capable devices and other devices) within the network at particular ranges as denoted by the concentric semi-circular lines (with the line closest to the router icon being indicative of the strongest signal (as from a wired connection), and with lines progressively further from the router icon being indicative of weaker and weaker signal (as from various ranges of wireless connections).

In the embodiment of FIG. 5G, a living room TV and a desktop PC might each be connected to the local area network via wired connection (as denoted by the hexagonal TV icon and the hexagonal desktop PC icon, respectively), while a tablet computer, speakers, and a smart phone might each be connected to the network via wireless connection (as denoted by the circular tablet icon "Sarah's Tablet," the circular speaker icon, and the circular smart phone icon "John's Phone," respectively). As shown in the non-limiting embodiment of FIG. 5G, the circular icons denoting wireless connection might further include download and upload gauges on either side of the circular icon. For example, in the embodiment of FIG. 5G, Sarah's tablet might have an average download and upload bandwidths of 69 Mbps and 31 Mbps, respectively, while the speakers might have an average download and upload bandwidths of 29 Mbps and 8 Mbps, respectively, and John's Phone might have an average download and upload bandwidths of 45 Mbps and 15 Mbps, respectively. Although hexagonal and circular icons are used in the embodiment of FIG. 5G, the various embodiments are not so limited, and any polygonal or random-shaped icons may be used as appropriate or as desired to denote wired and wireless connections and/or to denote particular types of devices (e.g., IoT sensor devices, display devices, user devices, kitchen appliances, other household appliances, lighting devices, security system components, vehicles, and so on).

Although FIG. 5G depicts particular devices such as a TV, a PC, a tablet computer, speakers, and smart phone, the various embodiments are not so limited, and the devices can include, without limitation, any combination of one or more user devices, one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, or one or more exercise equipment, and/or the like. The one or more user devices might include, but are not limited to, a tablet computer, a desktop computer, a laptop computer, a smart phone, a mobile phone, a personal digital assistant, a portable gaming device, a gaming console, a television, and/or the like. The one or more sensors might include, but are not limited to, at least one of one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras, and/or the like.

Sub-panel 550b in FIG. 5G further depicts a circular menu icon at a bottom portion thereof that provides the user with predetermined menu options (which are not specifically shown, but may be related to how the devices are to be displayed, the shapes of the icons, whether to display download/upload bandwidths for wireless and/or wired devices, whether to allow temporary or permanent network connection for certain devices (e.g., user's own devices, devices associated with visitors, etc.), and/or the like). Sub-panel 550a in FIG. 5G might further depict an expand icon, which when selected might expand sub-panel 550a to display other information or other sub-panels (such as sub-panels 550c and 550d, as shown in the non-limiting embodiment of FIG. 5H).

In FIG. 5H, which shows the "Network" view, sub-panel 550c might be the same as sub-panel 550a, except that sub-panel 550c might additionally display other information, including, but not limited to, what type of Internet connection is currently feeding the router (e.g., fiber connection, digital subscriber line ("DSL") connection, asymmetric digital subscriber line ("ADSL") connection, cable connection, satellite connection, etc.), the Internet Protocol ("IP") address, the media access control ("MAC") address, and/or the like). Sub-panel 550d might list the number of 2.4 GHz wirelessly connected devices, the top network traffic for 2.4 GHz wirelessly connected devices, the number of 5 GHz wirelessly connected devices, the top network traffic for 5 GHz wirelessly connected devices, and/or the like. Sub-panel 550d might further include a collapse icon that collapses the sub-panels 550c and 550d back into sub-panel 550a. Although not shown, the expanded sub-panel 550a might further include sub-panels depicting graphical download and upload averages over time, graphical network usage data for each device, etc.

In FIG. 5I, which shows the "Overview" view (similar to FIG. 5G), a notification might be displayed as a floating sub-panel 555 overlaid on the panel 550 (e.g., as shown in FIG. 5G). The floating sub-panel 555 might display a parental control notification that alerts the user to attempted network usage by the user's children that triggers certain preset conditions that the user might set in the "Parental Controls" view (not shown). For example, in the non-limiting embodiment of FIG. 5I, the notification might be triggered when the user's child attempts to access a streaming video that is rated R. The notification sub-panel 555 might provide the user with options to either decline access to the child's device (in this case, "Sarah's Tablet") or to allow access. Other parental control options may be available to ensure that the user's children do not access content that is deemed too mature, as well as to protect the user's children from Internet predators (e.g., by flagging for the user suspicious communications to the children's devices, listing all communications from or to the children's devices, etc.), and/or the like.

Various other embodiments of user interfaces may be provided consistent with the invention as described above.

Exemplary System and Hardware Implementation

Figure 6:
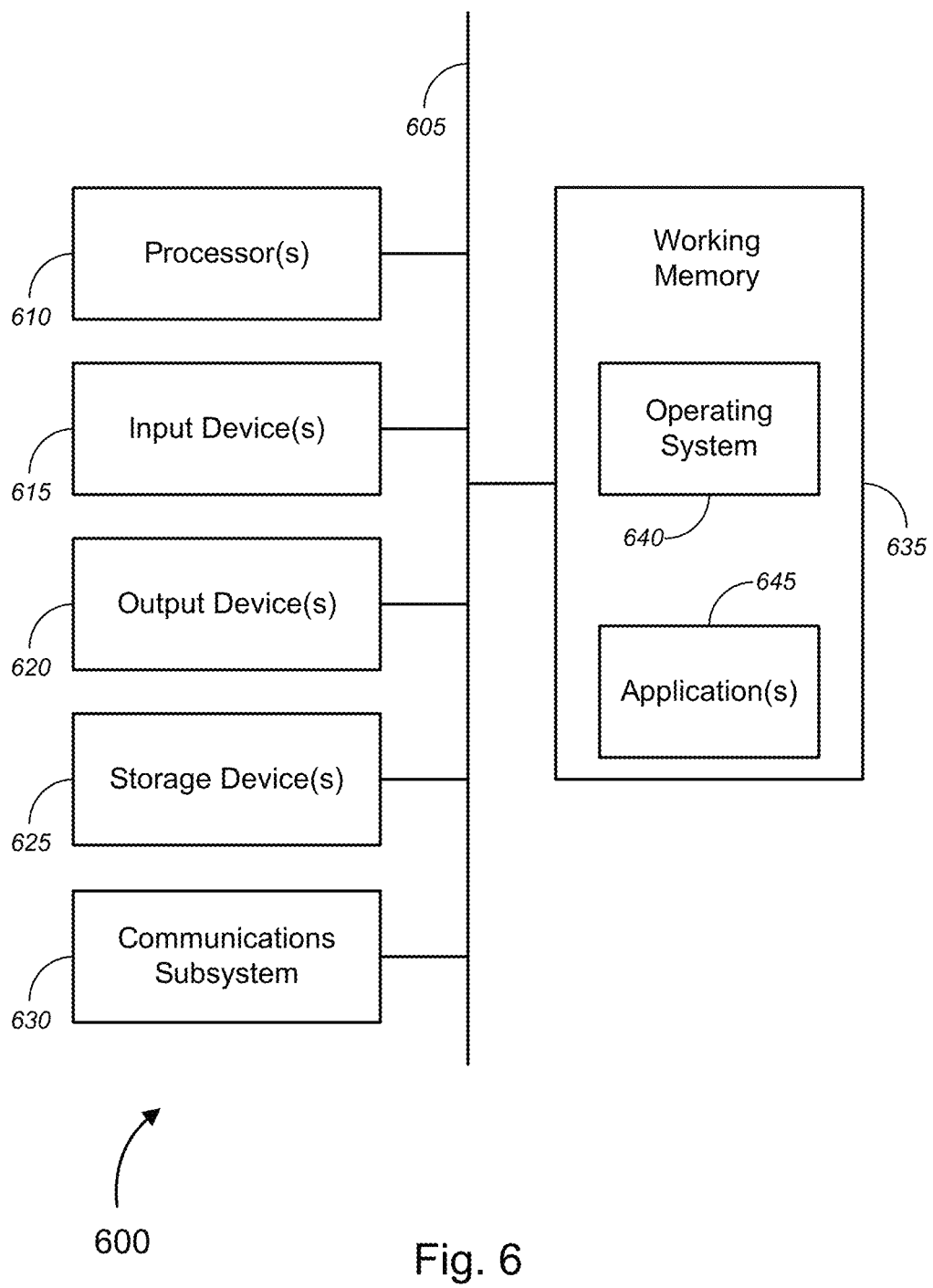
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., Internet of Things ("IoT") human interface devices 105 and 305, IoT-capable sensors 115a-115n, 310, and 310a-310h, IoT-capable devices 120a-120n, 315, and 315a-315y, computing system 125, analytics engine 145, etc.) or user devices (e.g., user devices 500, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., IoT human interface devices 105 and 305, IoT-capable sensors 115a-115n, 310, and 310a-310h, IoT-capable devices 120a-120n, 315, and 315a-315y, computing system 125, analytics engine 145, etc.) or user devices (e.g., user devices 500, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
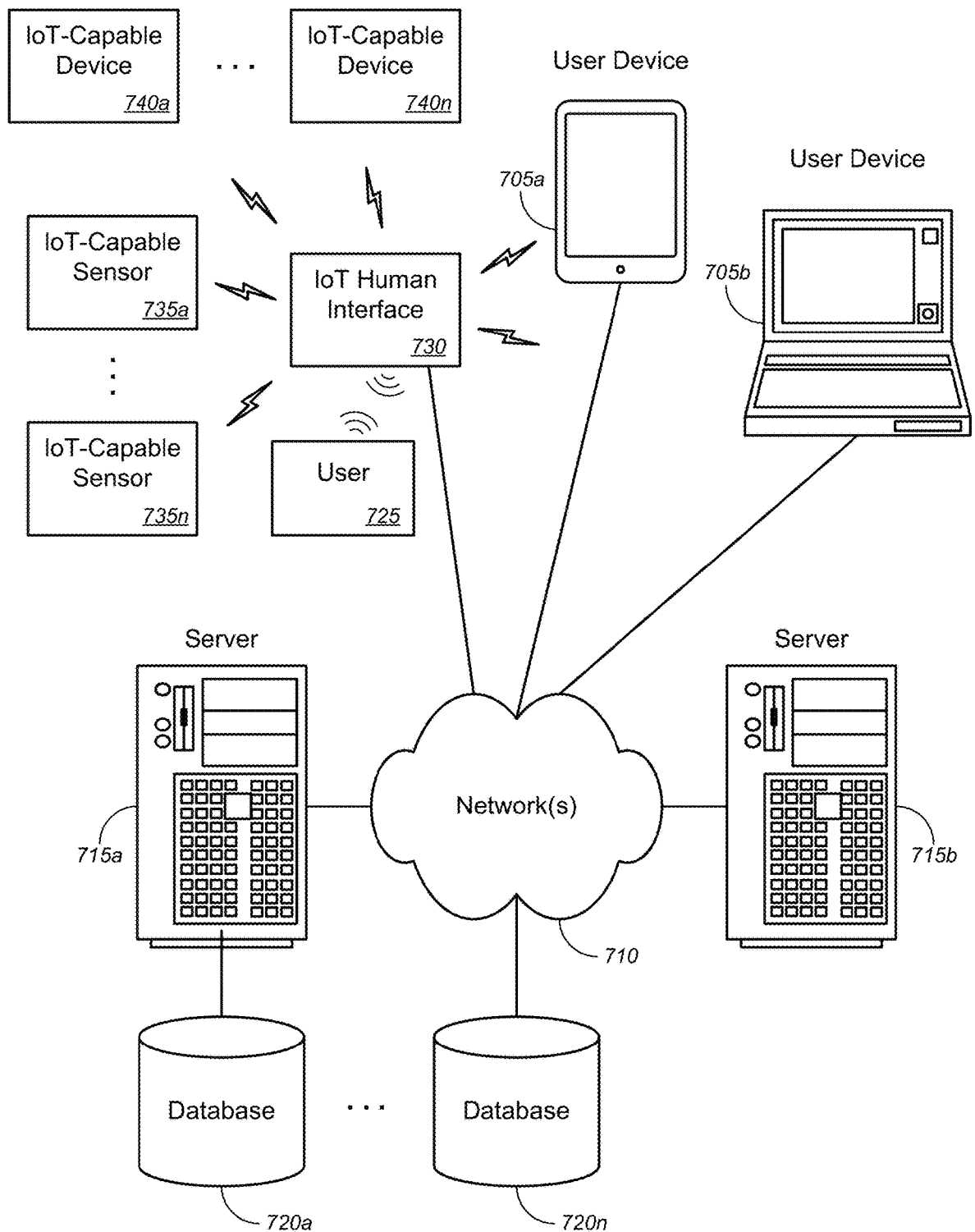
FIG. 7 is a block diagram illustrating an example of a networked system of computers, computing systems, or system hardware architecture, which can be used in accordance with various embodiments.

As noted above, a set of embodiments comprises methods and systems for implementing Internet of Things functionality, and, in particular embodiments, to methods, systems, apparatus, and computer software for implementing Internet of Things ("IoT") human interface functionality. FIG. 7 illustrates a schematic diagram of a system 700 that can be used in accordance with various embodiments. The system 700 can each include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network 130 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing Internet of Things functionality, and, in particular embodiments, to methods, systems, apparatus, and computer software for implementing Internet of Things ("IoT") human interface functionality, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

With reference to FIG. 7, according to some embodiments, system 700 might further comprise an IoT human interface device 730 (similar to IoT human interface device 105 or 305 of FIGS. 1-3, or the like), one or more IoT-capable sensors 735a-735n (similar to IoT-capable sensors 115a-115n, 310, or 310a-310h of FIGS. 1-3, or the like), and one or more IoT-capable devices 740a-740n (similar to IoT-capable devices 120a-120n, 315 or 315a-315y of FIGS. 1-3, or the like).

In operation, a user 725 might interact with the IoT human interface device 730 either via voice interaction (as shown, e.g., by the wave icons between the user 725 and the IoT human interface device 730 in FIG. 7, or the like) or via interaction through an app, user interface, and/or portal on the user's user device (e.g., 705a, 705b, and/or the like; as shown, e.g., in the embodiments of FIGS. 5A-5I, or the like). In the case of voice commands from the user 725, each of a plurality of microphones of the IoT human interface device might receive the voice input from the user 725, and the IoT human interface device 730 and/or a computing system (e.g., server 715a, 715b, or some other computing system, or the like) might identify one or more explicit commands in the voice input; might identify one or more first IoT-capable devices of the plurality of IoT-capable devices 740a-740n to which the one or more explicit commands are applicable; might receive one or more first sensor data from each of at least one first sensor of the plurality of IoT-capable sensors 735a-735n; might analyze the first voice input in view of previous voice inputs from the user and in view of the one or more first sensor data, to determine whether the first voice input additionally contains any implicit commands; based on a determination that the first voice input contains at least one implicit command, might identify one or more second IoT-capable devices of the one or more first IoT-capable devices to which the at least one implicit command is additionally applicable, generate second instructions for each of the one or more second IoT-capable devices, using a combination of the one or more explicit commands and the at least one implicit command, and send the generated second instructions to the one or more second IoT-capable devices; and, for each of the one or more first IoT-capable devices to which the at least one implicit command is not applicable, might generate first instructions, using the one or more explicit commands, and send the generated first instructions to the one or more first IoT-capable devices to which the at least one implicit command is not applicable; and/or the like. The machine-to-machine communications between the IoT human interface device 730 and each of the user devices 705a or 705b, the IoT-capable sensors 735a-735n, and the IoT-capable devices 740a-740n are represented in FIG. 7 by the lightning bolt symbols, which in some cases denotes wireless communications (although, in some instances, need not be wireless, but can be wired communications). These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with each of a plurality of microphones of an Internet of Things ("IoT") human interface device, a first voice input from a user, the plurality of microphones being disposed within a plane that is parallel with a cylindrical base of the IoT human interface device;
identifying, with a computing system, one or more explicit commands in the first voice input;
identifying, with the computing system, one or more first IoT-capable devices of a plurality of IoT-capable devices to which the one or more explicit commands are applicable;
receiving, with the computing system, one or more first sensor data from each of at least one first sensor;
analyzing, with the computing system, the first voice input in view of previous voice inputs from the user and in view of the one or more first sensor data, to determine whether the first voice input additionally contains any implicit commands;
based on a determination that the first voice input contains at least one implicit command, identifying, with the computing system, one or more second IoT-capable devices of the one or more first IoT-capable devices to which the at least one implicit command is additionally applicable, generating, with the computing system, second instructions for each of the one or more second IoT-capable devices, using a combination of the one or more explicit commands and the at least one implicit command, and sending, with the computing system, the generated second instructions to the one or more second IoT-capable devices; and
for each of the one or more first IoT-capable devices to which the at least one implicit command is not applicable, generating, with the computing system, first instructions, using the one or more explicit commands, and sending, with the computing system, the generated first instructions to the one or more first IoT-capable devices to which the at least one implicit command is not applicable;
wherein analyzing the first voice input to determine whether the first voice input additionally contains any implicit commands comprises:
determining, with the computing system, an intent of the user based at least in part on an identity of the user inputting the first voice input, based at least in part on the previous voice inputs received from the user identified by the computing system and the one or more first sensor data, and based at least in part on a detected mood of the user;
based on the detected mood of the user, determining, with the computing system, whether the at least one implicit command comprises a warning command to warn one or more persons different from the user of the detected mood of the user; and
determining, with the computing system, a match probability that indicates a probability that the determined intent of the user matches actual intent of the user;
wherein identifying, with the computing system, the one or more second IoT-capable devices of the one or more first IoT-capable devices to which the at least one implicit command is additionally applicable comprises:
based on a determination that the at least one implicit command comprises the warning command to warn the one or more persons of the detected mood of the user, identifying, with the computing system, the one or more second IoT-capable devices of the one or more first IoT-capable devices to use to warn the one or more persons of the detected mood of the user;
wherein the second instructions comprise a data structure that comprises the determined intent of the user, the determined match probability, and a tagged list listing at least the one or more second IoT-capable devices.

2. The method of claim 1, further comprising:
identifying, with the computing system, one or more third IoT-capable devices of the plurality of IoT-capable devices to which the at least one implicit command is applicable, the one or more third IoT-capable devices being separate from each of the one or more first IoT-capable devices and the one or more second IoT-capable devices;
generating, with the computing system, third instructions for each of the one or more third IoT-capable devices, using the at least one implicit command; and
sending, with the computing system, the generated third instructions to the one or more third IoT-capable devices.

3. The method of claim 1, wherein analyzing, with the computing system, the first voice input comprises analyzing, with the computing system, the first voice input utilizing artificial intelligence ("AI") to improve interactions with the user.

4. The method of claim 3, wherein the AI is further utilized to improve machine-to-machine interactions and to improve utilization of the at least one first sensor and the plurality of IoT-capable devices.

5. The method of claim 1, wherein the plurality of IoT-capable devices are separate from the IoT human interface device, wherein the plurality of IoT-capable devices comprises at least one of one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, or one or more exercise equipment.

6. The method of claim 5, wherein the one or more sensor devices comprises the at least one first sensor, and wherein the one or more sensor devices comprises at least one of one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras.

7. The method of claim 1, wherein the IoT human interface device comprises the at least one first sensor, and wherein the at least one first sensor comprises at least one of one or more temperature sensors, one or more light sensors, one or more humidity sensors, or one or more motion sensors.

8. The method of claim 1, wherein the computing system comprises one of a single processor disposed within the IoT human interface device, a plurality of processors disposed within the IoT human interface device, a server computer remote from the IoT human interface device, a cloud computing system, a distributed computing system that integrates computing resources from two or more IoT-capable devices of the plurality of IoT-capable devices, or a combination of two or more of these computing systems.

9. The method of claim 1, wherein the plurality of IoT-capable devices are separate from the IoT human interface device, wherein receiving, with the computing system, one or more first sensor data from each of at least one first sensor comprises receiving, with the computing system, one or more first sensor data from each of at least one first sensor, via one or more application programming interfaces ("APIs") established between the IoT human interface device and each of the at least one first sensor.

10. The method of claim 1, wherein receiving, with each of the plurality of microphones of the IoT human interface device, the first voice input from the user comprises utilizing at least one of far-field voice recognition, voice distinction, or a beam forming microphone array of the plurality of microphones.

11. The method of claim 1, wherein each IoT-capable device of the plurality of IoT-capable devices is assigned a unique IPv6 identifier.

12. The method of claim 1, wherein a same first voice input is received by the computing system from at least two different users, and wherein the computing system determines the implicit commands contained within the same first voice input are different based at least in part on the identity of the user inputting the first voice input and based at least in part on the previous voice inputs received from the user identified by the computing system.

13. The method of claim 1, wherein the warning command causes at least one of locking a door lock, illuminating a do-not-disturb sign, or sending a communication warning the one or more persons to one or more fourth IoT-capable devices associated with the one or more persons.

14. A system, comprising:
at least one first sensor;
an Internet of Things ("IoT") human interface device, comprising:
a cylindrical base;
a plurality of microphones that are disposed within a plane that is parallel with the cylindrical base;
one or more speakers;
at least one first processor;
a data store; and
a non-transitory computer readable medium in communication with each of the at least one first processor and the data store, the non-transitory computer readable medium having stored thereon computer software comprising a first set of instructions that, when executed by the at least one first processor, causes the IoT human interface device to:
receive, with each of the plurality of microphones, a first voice input from a user; and
send the first voice input to a computing system;
the computing system, comprising:
at least one second processor; and
a non-transitory computer readable medium in communication with the at least one second processor, the non-transitory computer readable medium having stored thereon computer software comprising a second set of instructions that, when executed by the at least one second processor, causes the computing system to:
receive the first voice input from the IoT human interface device;

identify one or more explicit commands in the first voice input;

identify one or more first IoT-capable devices of a plurality of IoT-capable devices to which the one or more explicit commands are applicable;

receive one or more first sensor data from each of the at least one first sensor;

analyze the first voice input in view of previous voice inputs from the user and in view of the one or more first sensor data, to determine whether the first voice input additionally contains any implicit commands;

based on a determination that the first voice input contains at least one implicit command, identify one or more second IoT-capable devices of the one or more first IoT-capable devices to which the at least one implicit command is additionally applicable, generate second instructions for each of the one or more second IoT-capable devices, using a combination of the one or more explicit commands and the at least one implicit command, and send the generated second instructions to the one or more second IoT-capable devices; and for each of the one or more first IoT-capable devices to which the at least one implicit command is not applicable, generate first instructions, using the one or more explicit commands, and send the generated first instructions to the one or more first IoT-capable devices to which the at least one implicit command is not applicable;

wherein analyzing the first voice input to determine whether the first voice input additionally contains any implicit commands comprises:

determining an intent of the user based at least in part on an identity of the user inputting the first voice input, based at least in part on the previous voice inputs received from the user identified by the computing system and the one or more first sensor data, and based at least in part on a detected mood of the user;

based on the detected mood of the user, determining, with the computing system, whether the at least one implicit command comprises a warning command to warn one or more persons different from the user of the detected mood of the user; and determining a match probability that indicates a probability that the determined intent of the user matches actual intent of the user;

wherein identifying the one or more second IoT-capable devices of the one or more first IoT-capable devices to which the at least one implicit command is additionally applicable comprises:

based on a determination that the at least one implicit command comprises the warning command to warn the one or more persons of the detected mood of the user, identifying the one or more second IoT-capable devices of the one or more first IoT-capable devices to use to warn the one or more persons of the detected mood of the user;

wherein the second instructions comprise a data structure that comprises the determined intent of the user, the determined match probability, and a tagged list listing at least the one or more second IoT-capable devices; and the plurality of IoT-capable devices, each of the one or more IoT-capable devices of the plurality of IoT-capable devices comprising:

at least one third processor; and a non-transitory computer readable medium in communication with the at least one third processor, the non-transitory computer readable medium having stored thereon computer software comprising a third set of instructions that, when executed by the at least one third processor, causes the IoT-capable device to:

receive the generated first or second instructions;

perform one or more tasks in accordance with the received first or second instructions; and update the computing system with progress of each of the one or more tasks.

15. The system of claim 14, wherein the second set of instructions, when executed by the at least one second processor, further causes the computing system to:

identify one or more third IoT-capable devices of the plurality of IoT-capable devices to which the at least one implicit command is applicable, the one or more third IoT-capable devices being separate from each of the one or more first IoT-capable devices and the one or more second IoT-capable devices;

generate third instructions for each of the one or more third IoT-capable devices, using the at least one implicit command; and send the generated third instructions to the one or more third IoT-capable devices.

16. The system of claim 14, wherein each microphone of the plurality of microphones is disposed equidistant from adjacent microphones and is disposed at a predetermined radius from a vertical axis that is orthogonal to a center of the cylindrical base of the IoT human interface device.

17. The system of claim 14, wherein the plurality of IoT-capable devices are separate from the IoT human interface device, wherein the plurality of IoT-capable devices comprises at least one of one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, one or more exercise equipment, or the IoT human interface device.

18. The system of claim 17, wherein the one or more sensor devices comprises the at least one first sensor, and wherein the one or more sensor devices comprises at least one of one or more temperature sensors, one or more light sensors, one or more humidity sensors, one or more motion sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras.

19. The system of claim 14, wherein the IoT human interface device comprises the at least one first sensor, and wherein the at least one first sensor comprises at least one of one or more temperature sensors, one or more light sensors, one or more humidity sensors, or one or more motion sensors.

20. The system of claim 19, wherein the at least one first sensor further comprises at least one of one or more air quality sensors, one or more carbon monoxide sensors, one or more smoke detectors, one or more water leak detectors, one or more contact sensors, one or more audio sensors, one or more proximity sensors, one or more biometrics sensors, one or more location sensors, one or more radiation sensors, one or more telecommunications signal sensors, or one or more cameras.

21. The system of claim 14, wherein the computing system comprises one of a single processor disposed within the IoT human interface device, a plurality of processors disposed within the IoT human interface device, a server computer remote from the IoT human interface device, a cloud computing system, a distributed computing system that integrates computing resources from two or more IoT-capable devices of the plurality of IoT-capable devices, or a combination of two or more of these computing systems.

22. The system of claim 14, wherein receiving one or more first sensor data from each of at least one first sensor comprises receiving one or more first sensor data from each of at least one first sensor, via one or more application programming interfaces ("APIs") established between the IoT human interface device and each of the at least one first sensor.

23. The system of claim 14, wherein each IoT-capable device of the plurality of IoT-capable devices is assigned a unique IPv6 identifier.

24. An Internet of Things ("IoT") human interface device, comprising:
  a cylindrical base;
  a plurality of microphones that are disposed within a plane that is parallel with the cylindrical base;
  one or more speakers;
  one or more communications transceivers;
  at least one processor;
  a data store; and
  a non-transitory computer readable medium in communication with each of the at least one processor and the data store, the non-transitory computer readable medium having stored thereon computer software comprising a set of instructions that, when executed by the at least one processor, causes the IoT human interface device to:
    receive, with each of the plurality of microphones, a first voice input from a user;
    identify one or more explicit commands in the first voice input;
    identify one or more first IoT-capable devices of a plurality of IoT-capable devices to which the one or more explicit commands are applicable;
    receive one or more first sensor data from each of the at least one first sensor;
    analyze the first voice input in view of previous voice inputs from the user and in view of the one or more first sensor data, to determine whether the first voice input additionally contains any implicit commands;
    based on a determination that the first voice input contains at least one implicit command, identify one or more second IoT-capable devices of the one or more first IoT-capable devices to which the at least one implicit command is additionally applicable, generate second instructions for each of the one or more second IoT-capable devices, using a combination of the one or more explicit commands and the at least one implicit command, and send the generated second instructions to the one or more second IoT-capable devices; and
    for each of the one or more first IoT-capable devices to which the at least one implicit command is not applicable, generate first instructions, using the one or more explicit commands, and send the generated first instructions to the one or more first IoT-capable devices to which the at least one implicit command is not applicable;
  wherein analyzing the first voice input to determine whether the first voice input additionally contains any implicit commands comprises:
    determining an intent of the user based at least in part on an identity of the user inputting the first voice input, based at least in part on the previous voice inputs received from the user identified by the computing system and the one or more first sensor data, and based at least in part on a detected mood of the user;
    based on the detected mood of the user, determining whether the at least one implicit command comprises a warning command to warn one or more persons different from the user of the detected mood of the user; and
    determining a match probability that indicates a probability that the determined intent of the user matches actual intent of the user;
  wherein identifying the one or more second IoT-capable devices of the one or more first IoT-capable devices to which the at least one implicit command is additionally applicable comprises:
    based on a determination that the at least one implicit command comprises the warning command to warn the one or more persons of the detected mood of the user, identifying the one or more second IoT-capable devices of the one or more first IoT-capable devices to use to warn the one or more persons of the detected mood of the user;
  wherein the second instructions comprise a data structure that comprises the determined intent of the user, the determined match probability, and a tagged list listing at least the one or more second IoT-capable devices.

25. The IoT human interface device of claim 24, wherein the set of instructions, when executed by the at least one processor, further causes the IoT human interface device to:
  identify one or more third IoT-capable devices of the plurality of IoT-capable devices to which the at least one implicit command is applicable, the one or more third IoT-capable devices being separate from each of the one or more first IoT-capable devices and the one or more second IoT-capable devices;
  generate third instructions for each of the one or more third IoT-capable devices, using the at least one implicit command; and
  send the generated third instructions to the one or more third IoT-capable devices.

26. The IoT human interface device of claim 24, wherein each microphone of the plurality of microphones is disposed equidistant from adjacent microphones and is disposed at a predetermined radius from a vertical axis that is orthogonal to a center of the cylindrical base of the IoT human interface device.

27. The IoT human interface device of claim 24, wherein analyzing the first voice input comprises analyzing the first voice input utilizing artificial intelligence ("AI") to improve interactions with the user.

28. The IoT human interface device of claim 27, wherein the AI is further utilized to improve machine-to-machine interactions between the IoT human interface device and each of the plurality of IoT-capable devices, and to improve utilization of the at least one first sensor and the plurality of IoT-capable devices.

29. The IoT human interface device of claim 24, further comprising:
- the at least one first sensor, wherein the at least one first sensor comprises at least one of one or more temperature sensors, one or more light sensors, one or more humidity sensors, or one or more motion sensors.

30. The IoT human interface device of claim 29, wherein the at least one first sensor further comprises at least one of one or more air quality sensors, one or more carbon monoxide sensors, one or more smoke detectors, one or more water leak detectors, one or more contact sensors, one or more audio sensors, one or more proximity sensors, one or more biometrics sensors, one or more location sensors, one or more radiation sensors, one or more telecommunications signal sensors, or one or more cameras.

* * * * *